United States Patent [19]

Sukigara et al.

[11] Patent Number: 4,827,286

[45] Date of Patent: May 2, 1989

[54] THERMAL TRANSFER PRINTER

[75] Inventors: Akihiko Sukigara, Tokyo; Shigeru Mizoguchi, Kawasaki; Yuzo Wada, Yokohama; Yoshikazu Shibamiya; Noriyoshi Ohshima, both of Tokyo, all of Japan

[73] Assignee: Canon Kabushiki Kaisha, Tokyo, Japan

[21] Appl. No.: 136,209

[22] Filed: Dec. 21, 1987

[30] Foreign Application Priority Data

Dec. 27, 1986 [JP] Japan ................................ 61-312641

[51] Int. Cl.[4] .............................................. G01D 15/10

[52] U.S. Cl. ................................ 346/76 PH; 400/125

[58] Field of Search ............. 346/76 PH; 400/120 PH

[56] References Cited

FOREIGN PATENT DOCUMENTS 0169377 10/1982 Japan .................................. 400/120

0169376 10/1982 Japan .................................. 400/120

0212284 12/1984 Japan .................................. 400/120

0255463 12/1985 Japan .............................. 346/76 PH 0049867 3/1986 Japan .............................. 346/76 PH

*Primary Examiner*—E. A. Goldberg

*Assistant Examiner*—Huan H. Tran

*Attorney, Agent, or Firm*—Fitzpatrick, Cella, Harper & Scinto

[57] ABSTRACT

There is a thermal transfer printer for recording dot information by use of heating energies. This printer comprises: a memory in which dot information indicative of a pattern to be recorded is stored; a thermal head to generate heating energies; and a controller to control the generation timing of the heating energies from the thermal head. When the ON-state dot information to be recorded which was stored in the memory does not exist in the first recording cycle and when the ON-state dot information to be recorded in the next second recording cycle exists, the controller controls the thermal head so as to generate the auxiliary heating energies in the first recording cycle prior to the dot information to be recorded. The auxiliary heating energies in the first recording cycle are generated at a timing near the start of the first recording cycle. The recording cycle is decided on the basis of the switching of the excitation phase of a motor to control the movement of the carriage on which the thermal head is mounted. With this printer, the high quality recording can be always performed for various kinds of print ribbons.

18 Claims, 40 Drawing Sheets

P'PM CONTROL ("A" PATTERN IN FIG. 5)

P'PM(321) CONTROL ("A" PATTERN IN FIG. 5)

P'MP CONTROL
("A" PATTERN IN FIG. 5)

(a)

AMA³ CONTROL
("B" PATTERN IN FIG. 5)

(b)

A³MA CONTROL
("B" PATTERN IN FIG. 5)

A²AMA CONTROL
("B" PATTERN IN FIG. 5)

$A^3MA^3$ CONTROL
("B" PATTERN IN FIG. 5)

$AA^3MA$ CONTROL
("B" PATTERN IN FIG. 5)

FIG. 18
(a)
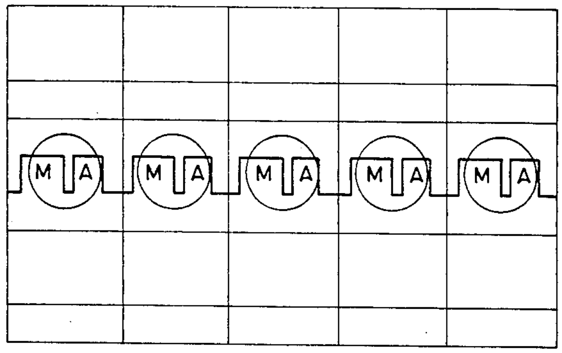
(b)
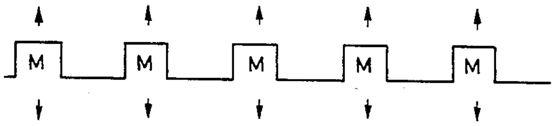
FIG. 19-1
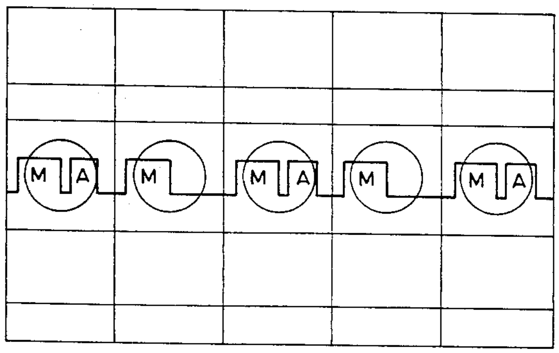

"コ"-SHAPE DOT CONTROL
("D" PATTERN IN FIG. 5)

"П"-SHAPE DOT CONTROL
("E" PATTERN IN FIG. 5)

"□"-SHAPE DOT CONTROL
("F" PATTERN IN FIG. 5)

P'P³M CONTROL
("B" PATTERN IN FIG. 5)

P' P³M

P'3PM CONTROL
("B" PATTERN IN FIG. 5)

P'3 PM

P'PMP' CONTROL
("B" PATTERN IN FIG. 5)

P' PMP'

P'PMP'2 CONTROL
("B" PATTERN IN FIG. 5)

P2P'PM CONTROL
("B" PATTERN IN FIG. 5)

P′P³MP′³ CONTROL
("B" PATTERN IN FIG. 5)

P′³PMP′³ CONTROL
("B" PATTERN IN FIG. 5)

P²P'PMP'³ CONTROL
("B" PATTERN IN FIG. 5)

PP'³ PMP' CONTROL
("3" PATTERN IN FIG. 5)

THERMAL TRANSFER PRINTER

BACKGROUND OF THE INVENTION

1. Field of the Invention

The present invention relates to a recording unit which can record at a high quality or to an apparatus having such a recording unit and, more particularly, to a technique to control a recording energy.

2. Related Background Art

Hitherto, as printers for recording a pattern such as characters, graphics, or the like, for example, a thermal transfer printer using a heating energy has been developed.

In recent years, a thermal transfer printer which can attach a plurality of kinds of ribbons is also being developed. However, as a method of controlling the thermal heads, only a method of controlling, e.g., a width of heat pulse or the like and a conventional similar method are used. The high quality recording is not always performed in dependence on the kind of ribbon. A further improvement is demanded.

As a method of correcting the heating energy upon recording in a thermal transfer printer, there is considered a method whereby one pulse or two pulses of different widths are output within one heat cycle when dot information to be recorded exists on the basis of the on/off of the dot pattern which is obtained from a character generator CG, thereby changing an energy to be applied and eventually uniforming the heating energies. However, the method of uniforming the heating energies to the dots within one heat cycle of the dots to be recorded has a drawback such that the high quality recording is not always obtained.

Further, as a method of improving this drawback, there is considered a method whereby a preheat is given even in the cycles other than one heat cycle for recording to thereby uniform the heating energies. However, when the preheating position is away from the position to be printed, particularly, in a low speed printer or the like, it is presumed that the expected uniformity of the heating energies is not obtained.

On the other hand, when improving as mentioned above, namely, when the preheat is given in the cycles other than one heat cycle to be recorded, particularly, the ambient temperature of one independent dot is low, so that the heating energies escape. For example, at the left end of the pattern to be recorded, the heating energies in the upper, lower, right, and left directions escape. Thus, it is presumed that the high quality recording cannot be performed.

The foregoing drawback is particularly typical in the case of recording an underline.

In addition, even when improving as mentioned above, for example, in the case of recording such patterns as shown in FIGS. 20 and 21, if the A data indicated by broken lines was heated by the foregoing method, it is considered that the blank portions in the "コ", "⊓", and "⊔" shapes are deformed.

For example, as shown in FIG. 22, when recording such a pattern that the areas in the peripheral four directions are surrounded by the dots to be recorded, if the A data indicated by broken lines and further the M data as dot information were heated by the foregoing method, it is considered that the heating energies are concentrated to the central dot and a variation in heating energy occurs.

As a method of eliminating the foregoing drawbacks, there is considered a method whereby in the recording cycle before the first recording cycle of the dot information to be recorded, the preheating energy is given in the cycle near the second recording cycle. However, there is a fear such that the heating energies are unstable and the uniform recording cannot be executed until the second recording cycle to record the next dot information to be recorded.

SUMMARY OF THE INVENTION

It is an object of the present invention to provide a printer which can always perform the high quality recording by further improving the foregoing possible techniques or to provide its control method.

In consideration of the foregoing points, it is another object of the invention to provide a printer which can always perform the high quality recording even if ribbons are variably changed or to provide its control method.

In consideration of the foregoing points, it is still another object of the invention to provide a printer which can perform the extremely high quality recording by applying a preheat even in the cycles other than one heat cycle of the dot information to be recorded or to provide its control method.

In consideration of the foregoing points, it is still another object of the invention to provide a printer in which a plurality of heat pulses are given for the dots to be recorded within one heat cycle and for the spare dots (auxiliary dots), and preheat pulses are further given in the one-preceding heat cycle of that heat cycle, thereby uniforming the heating energies or to provide its control method.

Still another object of the invention is to make the preheat pulse which is given in the one-preceding heat cycle approach the heat cycle to perform the actual recording, thereby uniforming the heating energies.

In consideration of the foregoing points, it is a still another object of the invention to provide a printer in which in a predetermined heat cycle, the preheat is also applied in the cycles other than one heat cycle of the dot information to be recorded, the heating energies corresponding to the dot information to be recorded are not generated, and an underline can be recorded at an extremely high quality, or to provide its control method.

Still another object of the invention is to provide a printer comprising heating energy generating means for generating heating energies; instructing means for instructing the recording of dot information train which are continuous in the recording direction; and control means for controlling the heating energy generating means in such a manner that after the heating energies corresponding to the dot information to be recorded in the first recording cycle were generated, the recording is performed by generating the preheating energies prior to the dot information to be recorded in the second recording cycle on the basis of the instructing means, and in a predetermined recording cycle, the preheating energies to be generated after the dot information to be recorded in this predetermined recording cycle are not generated.

In consideration of the foregoing points, still another object of the invention is to provide a printer in which by auxiliarily applying the heating energies to the periphery of dot information to be recorded, these dots can be certainly recorded or to provide its control method.

Still another object of the invention is to provide a printer comprising: heating energy generating means for generating heating energies; instructing means for instructing the recording of dot information train which are continuous in the recording direction; and control means for controlling the heating energy generating means in such a manner that after the heating energies corresponding to the dot information to be recorded in the first recording cycle were generated, the recording is performed by generating the preheating energies prior to the dot information to be recorded in the second recording cycle on the basis of the instructing means, and in a predetermined recording cycle, the preheating energies to be generated after the dot information to be recorded in this predetermined recording cycle are not generated.

In consideration of the foregoing points, still another object of the invention is to provide a printer in which the preheat to the center is not performed in the case where a pattern to be recorded is the "⊐", "⊓", "⊔", or "□" shape, and the high quality recording can be always performed even in any patterns or to provide its control method.

In consideration of the foregoing points, still another object of the invention is to provide a thermal transfer printer in which with respect to the dot information surrounded by the dots to be recorded in the peripheral four directions, the heating energies are reduced to such levels that cannot make blanks areas, and the high quality recording can be always performed.

In consideration of the foregoing points, still another object of the invention is to provide a printer which can perform the extremely high quality recording by also correcting the foregoing first to second cycles or to provide its control method.

Still another object of the invention is to apply the additional preheating energies in the further upper or lower direction of the given preheating energies in the recording cycle before the recording cycle of the dot information to be recorded.

Still another object of the invention is to enable the independent dot information to be certainly recorded even at low temperatures.

BRIEF DESCRIPTION OF THE DRAWINGS

FIG. 18 is an explanatory diagram for control of one serial/lateral dot in the AMA control to heat the portion of the pattern C shown in FIG. 5;

FIGS. 19-1 to 19-3 are explanatory diagrams for examples of application in FIG. 18;

FIGS. 33-1 to 33-5 are diagrams showing examples of application in FIG. 32;

DETAILED DESCRIPTION OF THE PREFERRED EMBODIMENT

An embodiment of the present invention will be described in detail hereinbelow with reference to the drawings.

(Description of the typewriter main unit)

Figure 1:
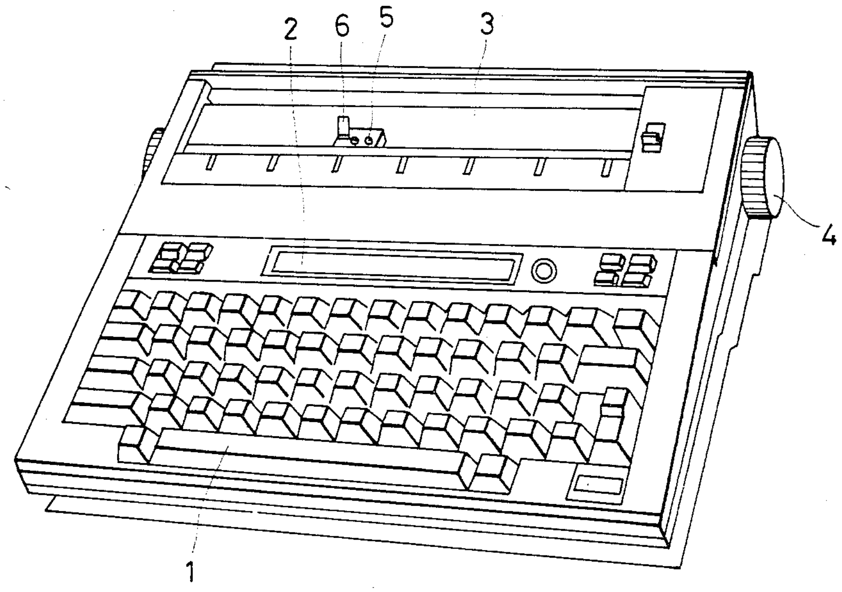
FIG. 1 is an external view of an electronic typewriter.

FIG. 1 is a diagram showing an external view of an electronic typewriter as a thermal transfer printer to which the invention can be applied.

A thermal head 6 mounted on a carriage 5 of a printer unit 3 is pressed onto a platen through an ink ribbon (not shown) by operating keys arranged in a keyboard unit 1 and the heat is applied. Thus, the printing is performed by the ink of the ribbon onto a print paper which is fed by the platen. An LCD (liquid crystal display) unit 2 to display the content to be printed and a platen knob 4 to manually feed the print paper are also provided.

The electronic typewriter (thermal transfer printer) in the embodiment can attach a plurality of kinds of ribbons and can discriminate the attachment of the following ribbons by a sensor (not shown) or by an instruction from the key namely, an (ordinary) ink ribbon IR in which the single color printing can be performed at the same ribbon position; a correctable ribbon (self correction ribbon) CR in which the printing and erasure can be performed by the same ribbon; a dual color ribbon DR (refer to Japanese patent Application Nos. 260403/1984 and 298831/1985) in which the ribbon consists of a plurality of layers and a multi-color printing can be selectively performed at the same ribbon position in dependence on the layer to be printed; and the like.

Figure 2:
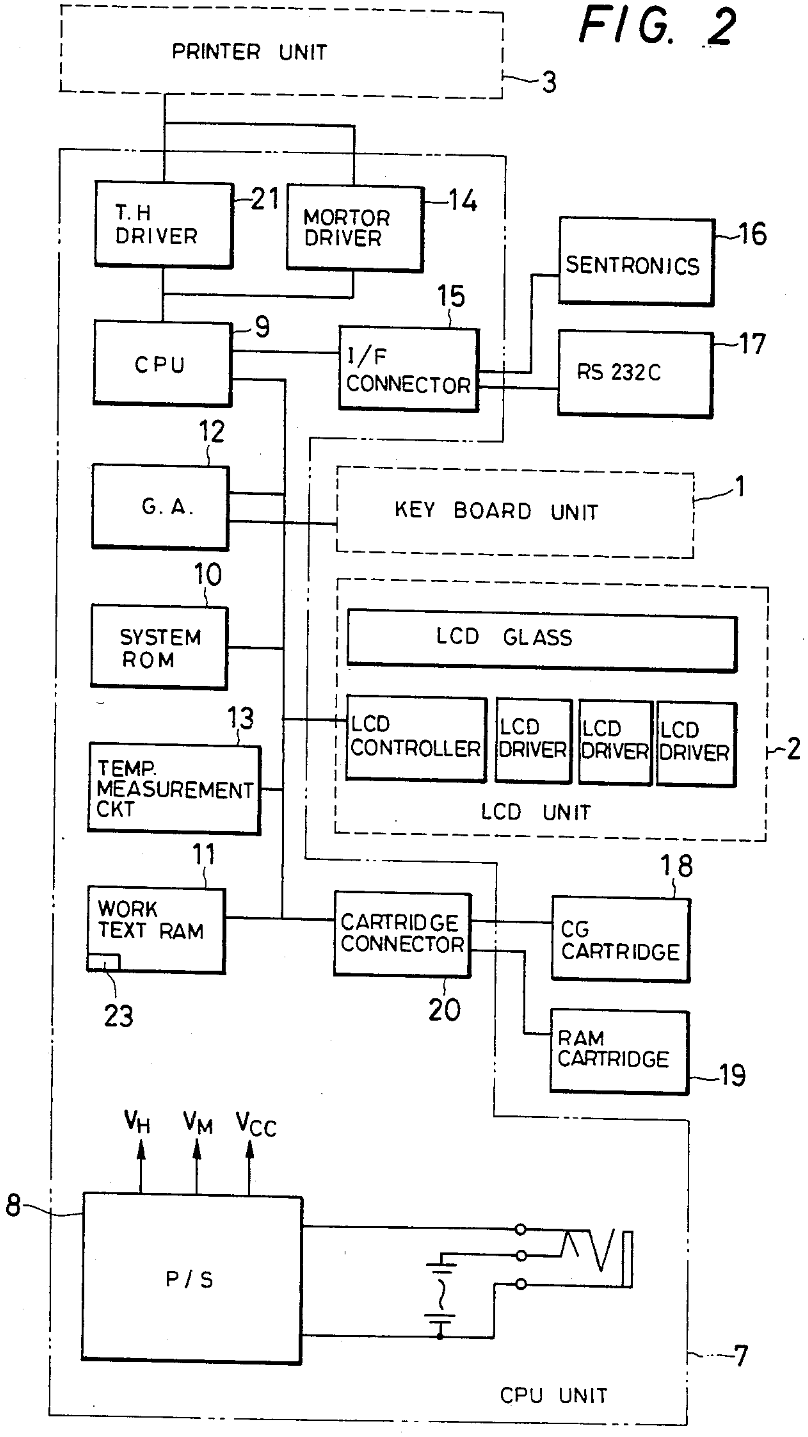
FIG. 2 is a constitutional block diagram of an electronic typewriter.

FIG. 2 shows a constitutional block diagram of the electronic typewriter.

(1) Printer unit 3:

This unit is the printing apparatus of the electronic typewriter and has the carriage 5 including therein a drive motor. The thermal head 6 is mounted in this unit.

(2) Keyboard unit 1:

This unit is used as the input unit and has a key matrix.

(3) LCD unit 2:

This unit displays the information to print or store. An LCD is used as a display surface. This unit has a controller and a driver to display the data from a CPU 9 onto the LCD 2.

(4) CPU unit 7:

An AC adapter, nickel cadmium battery, dry cell, and the like can be used as an input power source 8. From this power source, three power sources are produced: a power source (hereinafter, referred to as $V_{cc}$) to make the logic circuits including the CPU 9 operative; a power source (hereinafter, referred to as $V_M$) for the motor of the printer; a power source (hereinafter, referred to as $V_H$) which is applied to the thermal head.

A control system mainly comprises the CPU 9; an ROM 10 in which a system program and CG, which will be explained hereinlater, are stored; a memory device such as an RAM 11 or the like for a work or text; and a custom IC (gate array hereinafter, referred to as a GA 12) serving as expansion input/output terminals, address decoder, and the like of the CPU 9. The RAM 11 has a character count unit 23 to store widths of characters from the CG which are necessary for the control, which will be explained hereinlater. Temperature information from a temperature measurement circuit 13 is input to the control system and thereafter, the data which is sent to the thermal head 6 of the printer is transmitted through the GA 12 to a thermal head driver (TH driver) 21. Drive signals are sent from the CPU to the respective phases of a stepping motor 22(refer to FIG. 4)as the motor for the printer through a motor driver 14.

This typewriter has therein an interface connector 15. The I/F connector 15 can only receive the data from an external host computer in a manner such that this typewriter can be used as a printer through, for example, an interface 16 made by Sentronics Co., Ltd. or an RS-232C 17 so as to print this data. Further, the typewriter also has therein a cartridge connector 20 into which a CG cartridge 18 having character styles of the types as data and an RAM cartridge 19 to store registration data can be inserted.

(Constitution of the thermal head driver)

Figure 3:
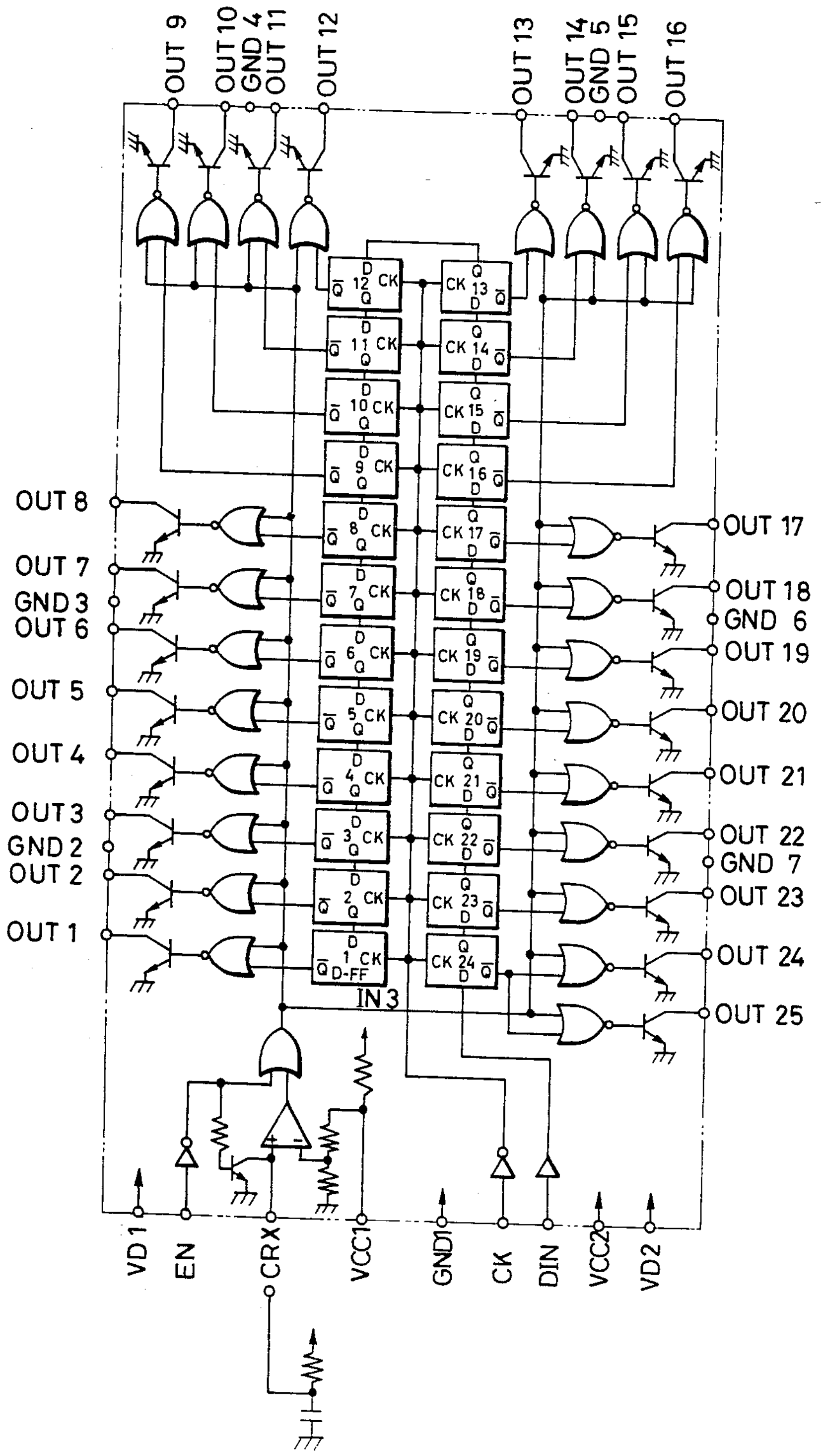
FIG. 3 is a constitutional diagram of a thermal head driver.

FIG. 3 shows a constitution of the thermal head driver IC 21 to heat the thermal head shown in FIG. 2.

$V_{cc1}$, $V_{cc2}$: Input terminals to receive power sources for the logic circuits $VD_1$, $VD_2$: Power sources for the driver to drive the thermal head $GND_1$ to $GND_7$: GND $OUT_1$ to $OUT_{25}$: Open collector output terminals corresponding to each dot of the head CK: Timing clock for data latch (from the GA 12)

DIN: Heat data input terminal (from the GA 12)

CRX: Terminal having an CR charging circuit in the outside of the IC. A print inhibition signal to inhibit the printing output for the thermal head can be output irrespective of the software when an EN terminal is at the high level at the charge voltage level of C EN: When the CRX terminal is at the low level, if the high level signal is input to the terminal EN, a print permission signal is output. When the low level signal is input to the terminal EN, a print inhibition signal is output.

In the foregoing constitution, first, to send the heat data to D flip-flops in the IC, the parallel data from the CPU 9 are converted into the serial data by the GA 12 and then transferred to the DIN terminal. Clocks are also sent from the GA 12 to the CK terminal of the TH driver 21. By repeating these operations twenty-four times, the heat data of one time is completely taken into the IC. In the next operation to transfer the heat data to the driver, by previously setting the EN terminal to the low level by a software command, the charges in a capacitor in the outside of the CRX terminal are discharged and the CRX terminal is set to the low level. The time duration to heat is set. Thereafter, the high level signal is sent to the EN terminal. From this time point, the heating operation is started in accordance with the latched data. The thermal head is continuously heated until a set time in the CPU has come or the EN terminal is set to the low level or the capacitor level of the CRX terminal has exceeded a set value.

Figure 5:
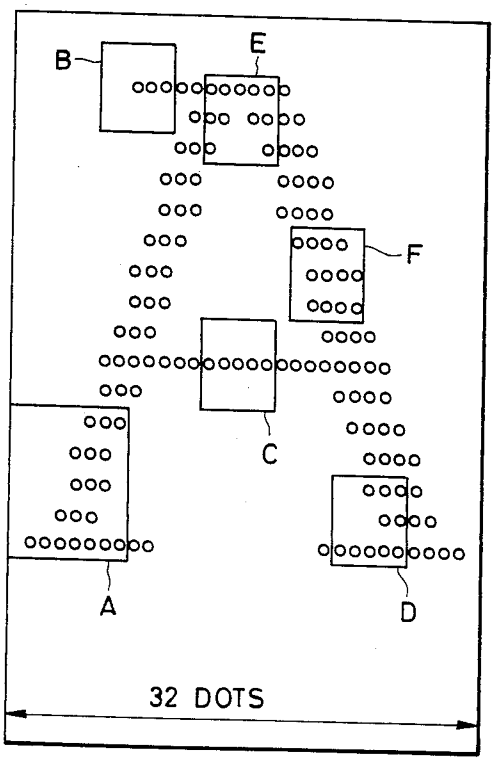
FIG. 5 is a diagram showing an example of a character font.

As will be also obvious from FIG. 3, the thermal head in the embodiment is constituted in such a manner that twenty-five heads $OUT_1$ to $OUT_{25}$ are vertically arranged in a line. When recording a pattern as shown in FIG. 5, the heads are moved, e.g., from the left to the right in FIG. 5, while the heating operations are executed at the recording timings corresponding to the respective dots, thereby performing the recording. The shape of head is not limited to this example.

Figure 4:
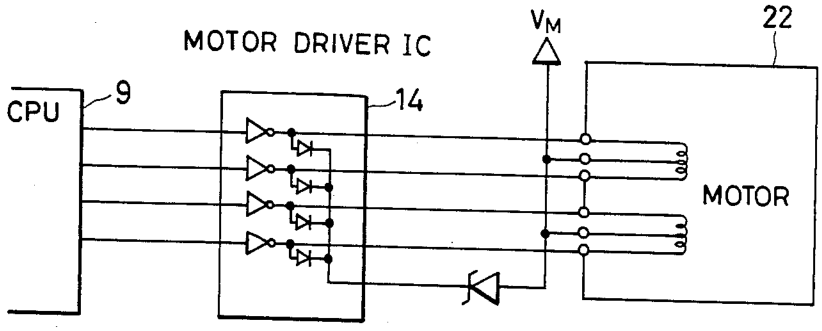
FIG. 4 is a constitutional diagram of a motor driver.

FIG. 4 shows a constitution of the motor driver IC 14 to drive the motor of the printer.

Signal lines of the CPU 9 are directly connected to input terminals of the motor driver IC 14 and their outputs are directly connected to the respective phases of the motor 22. The double phase excitation is performed in response to a software command. Thus, the carriage 5 on which the head 6 is mounted moves. In order to heat at a predetermined timing in association with the carriage movement, a reference interval of "heat cycle (one recording timing)" shown in FIG. 6 and the like is specified in accordance with the switching of each excitation.

The present invention will now be described in detail hereinbelow on the basis of the foregoing constitution with reference to the drawings. (Description of the character fonts)

FIG. 5 shows an example of a character font stored in the ROM 10 or CG cartridge 18 in FIG. 2. In this example, the character "A" is expressed by 24 dots (in the vertical direction)×32 dots (in the horizontal direction). Each dot is represented by a small circle (o). Fundamentally, the character "A" is applied with the heating energies in a manner such that the head (any one of the $OUT_1$ to $OUT_{25}$ in FIG. 3) of the portion corresponding to each dot (o) in a time or positional manner is heated once within one heat pulse. In this embodiment, as shown in FIG. 3, the head can print the vertically arranged 25 dots of $OUT_1$ to $OUT_{25}$. By horizontally moving the head, an arbitrary character is printed. A constitution of the head is not limited to this example. Each area indicated by "A" to "F" denotes a part of the pattern which will be used to explain the driving of the thermal head hereinlater. In FIG. 5, the lateral direction indicates a heat cycle and the vertical direction represents dot lines (the 1st line to the 25th line) corresponding to the heads of one vertical column.

The heating operation of the thermal head in the invention will now be described in detail. (AMA control)

Figure 6:
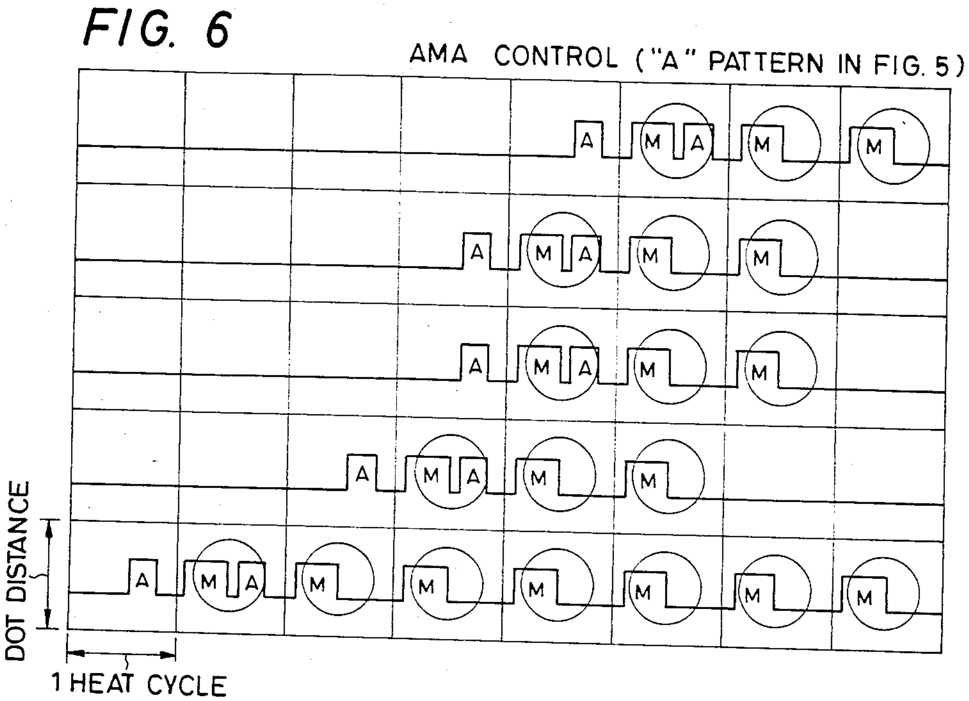
FIG. 6 is an explanatory diagram for AMA control to heat the portion of the pattern A in FIG. 5.

FIG. 6 is a diagram showing a printing state of the portion A in FIG. 5 on the basis of the heat pulses and heat data. The lateral direction of one lattice indicates one heat cycle and the vertical direction represents a distance (size) of one dot. A mark (o) indicates the heat data (corresponding to the CG). In the AMA control in this embodiment, the printing is controlled on the basis of two data consisting of after data (hereinafter, referred to as A data) and main data (hereinafter, referred to as M data) and their pulse widths. The A data is heated after the data of the main dot within one heat cycle with respect to the position. The pulse width and pulse position of each M data are set to be equal, respectively. The pulse width and pulse position of each A data are also set to be equal, respectively. The pulse position and the pulse timing are used as the equivalent meaning for convenience of explanation. The heat data indicated by the mark (o) corresponds to the M data in a one-to-one correspondence relation. On the other hand, it is difficult to suddenly heat the thermal head (i.e., the ribbon). When only the M data is heated, a variation in printing occurs. Namely, when the heat pulse width of the M data is long, in the case of the continuous dots, the heat is accumulated, so that the heating energy when heating later becomes high. On the contrary, when the heat pulse width is short, the heating energy of the dot at the start of the heating is low.

Therefore, to uniform the printing energy, i.e., to uniformly perform the printing, it is necessary to control by use of the different heating positions and the different heat pulses with respect to the A data and M data. According to the AMA control, since the interval between the A data to the next M data is short, the heat applied by the A data is hardly reduced. The AMA control is particularly effective at the ordinary or low temperatures (e.g., 30° C. or less) and the high quality printing can be obtained.

Although a detailed explanation will be made hereinafter, according to the AMA control, the CG data is previously read before the start of the heating by one dot. If data exists, only the A data is heated after the M data with respect to the position. The thermal head heated by this A data (the first A data in the AMA) executes the printing by the subsequent M data (at the next recording timing). The head is certainly warmed by the subsequent A data, so that the printing is surely performed. Further, this state also provides a preparation for the next M. The subsequent dot can print by only the M data as shown in FIG. 6.

(PPM control)

Figure 7:
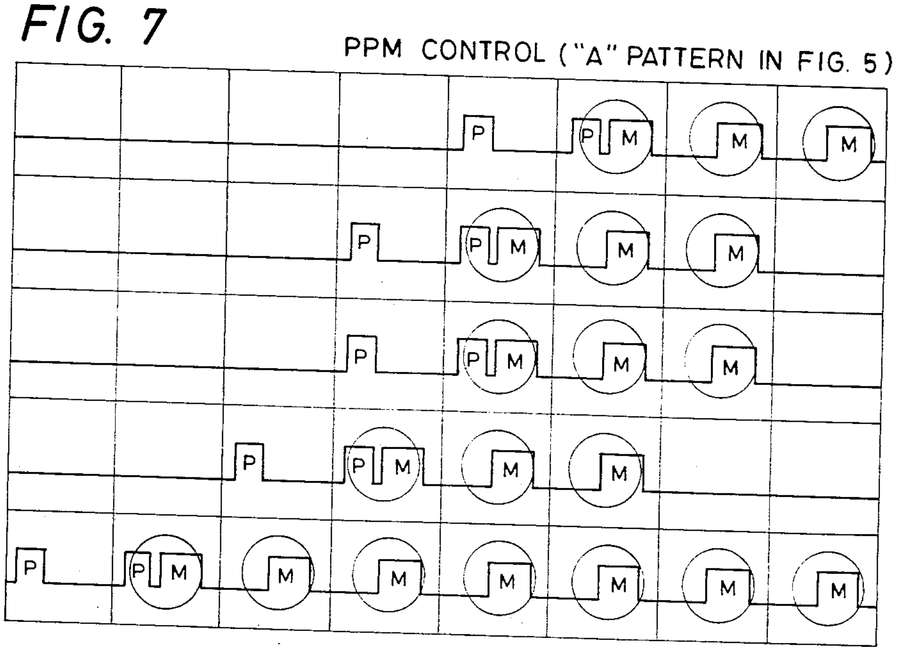
FIG. 7 is an explanatory diagram for PPM control to heat the portion in the pattern A in FIG. 5.

FIG. 7 is a diagram for explaining the PPM control in a manner similar to FIG. 6 with respect to the case of printing the pattern A in FIG. 5. FIG. 7 shows a printing state by use of the heat pulses and heat data. The mark (o) denotes heat data. In the PPM control, predata is given before the M data called P data with respect to the position. According to the PPM control, the printing is controlled by two P data (one is for the spare data and the other is the auxiliary data of the M data in one heat cycle) and the M data. The pulse width and pulse position of each M data are set to be equal, respectively. The pulse width and pulse position of each P data are also set to be equal, respectively. The heat data indicated by the mark (o) corresponds to the M data in a one-to-one correspondence relation. Particularly, at high temperatures, if the first dot is excessively corrected, there is a tendency such that the printing energy increases. However, to correct this tendency, the interval between the first P (spare) data and the next P (auxiliary) data is set to a long interval and the heating energy is dispersed during this interval. Due to this, the printing energies can be uniformed.

(P'PM control)

Figure 8:
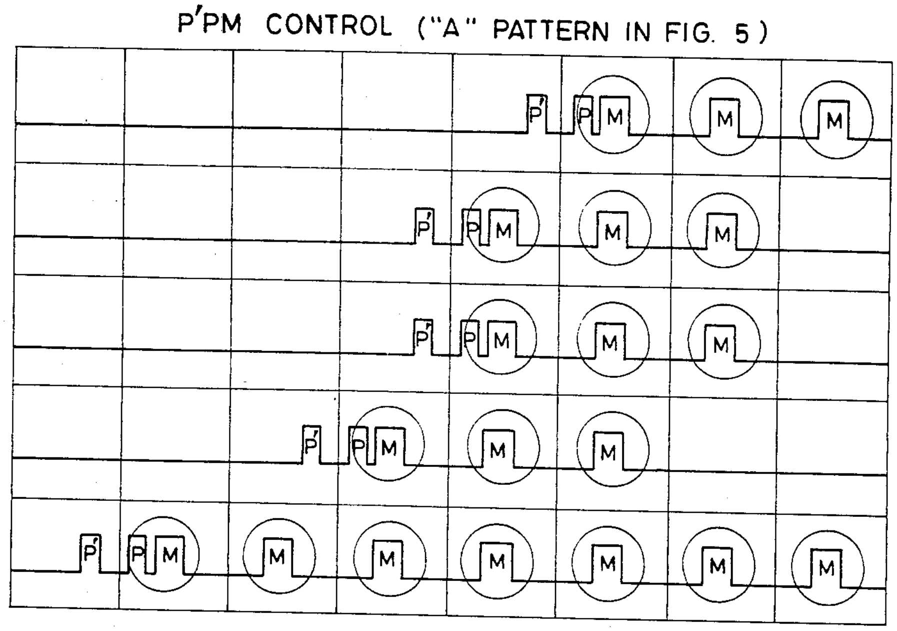
FIG. 8 is an explanatory diagram for P'PM control to heat the portion of the pattern A in FIG. 5.

FIG. 8 shows a printing state by the heat pulses and heat data in the case of printing the pattern A in FIG. 5 by the P'PM control. The mark (o) denotes heat data. In the P'PM control, the printing is controlled on the basis of pre dash data called P' data having a pulse width different from that of the P data, the P data, and the M data. Although this control should be referred to as the APM control in consideration of the foregoing control, it is referred to as the P'PM control for convenience of explanation. According to the P'BM control, three kinds of pulse widths and positions exist in one heat cycle. The P'PM control is used in the case of the printing having a relatively long heat cycle. Namely, when the heat cycle is long, if the A data and the next M data are printed in the heat cycle before the M data, the interval between the A data and the M data becomes too long, so that the warmed head is unexpectedly cooled. To prevent this, the heat pulse of the P data is interposed before the M data within the same heat cycle as that of the P" data M at a position near the end of the heat cycle before the M data, thereby constituting the P'PM control. With this control, the head warmed by the P' data can print by the P data and M data. Further, the second dot and subsequent dots can be printed by only the M data.

The P'PM control is particularly effective at, e.g., the ordinary or high temperatures.

(P'PM (3, 2, 1) control)

Figure 9:
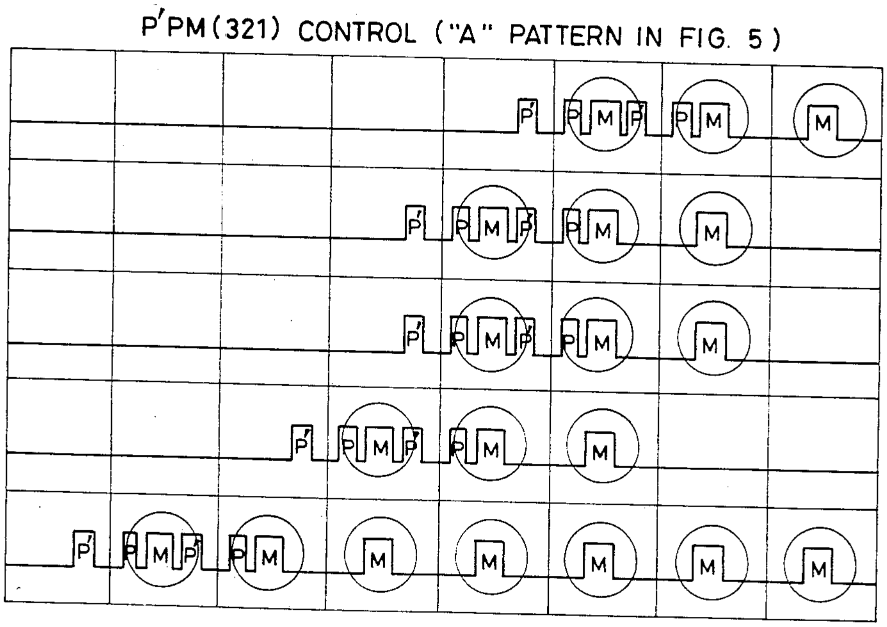
FIG. 9 is an explanatory diagram for P'PM (3, 2, 1) control to heat the portion of the pattern A in FIG. 5.

FIG. 9 shows a printing state by the heat pulses and heat data in the case of printing the pattern A in FIG. 5 by the P'PM (3, 2, 1) control. The mark (o) indicator heat data. The P'PM (3, 2, 1) control is constituted by three data consisting of the pre dash data called the P' data, the pre data called the P' data, and the main data called the M data, and three kinds of heat pulse widths and pulse positions. The P'PM (3, 2, 1) control is used in the case of the printing having a relatively long heat cycle.

For example, when the P'PM control which is effective at high or ordinary temperatures is used at low temperatures, there occurs a case where the printing energies for the first and second dots lack. To prevent a variation in printing due to this, the P'PM (3, 2, 1) control is executed. With this control, the printing energies can be uniformed. Namely, for the first dot, the head warmed by the first P' data in the one-preceding heat cycle performs the printing operation by the P data, M data, and next P' data (total three pulses) within one heat cycle of the M data. The second dot is printed by the P data and the second M data (total two pulses) within one heat cycle of the second M data. The third and subsequent dots can be printed by only the M data (total one pulse). In this P'PM (3, 2, 1) control, the heating energies to be applied are concentrated to the first and second dots.

(P'MP control)

Figure 10:
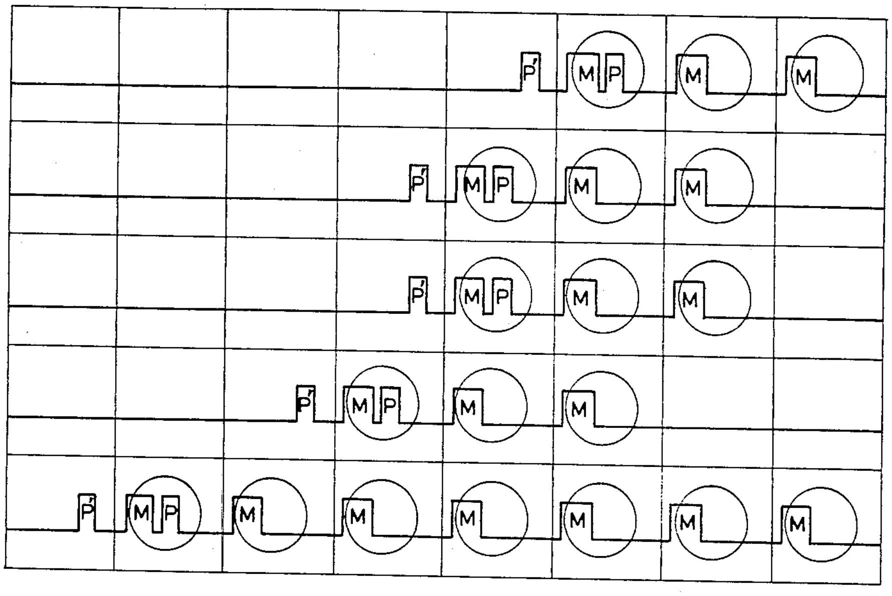
FIG. 10 is an explanatory diagram for P'MP control to heat the portion of the pattern A in FIG. 5.

FIG. 10 shows a printing state by the heat pulses and heat data in the case of printing the pattern A in FIG. 5 by the P'MP control. The P'MP control relates to an example of application of the P'PM control which is effective at ordinary or high temperatures. In this example, the positions of the P and M data in P'PM are exchanged.

(AMA$^3$ control)

Figure 11:
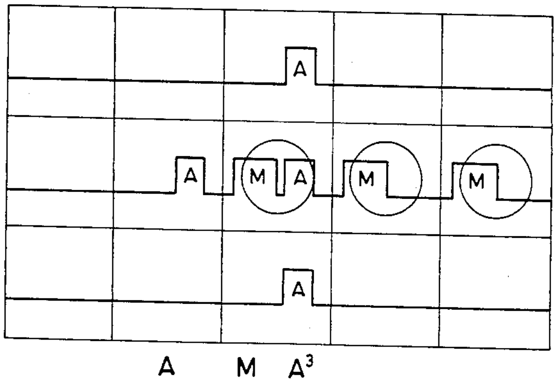
FIG. 11 is an explanatory diagram for $AMA^3$ control to heat the portion of the pattern B in FIG. 5.
Figure 11:
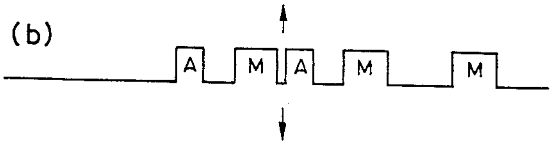

FIG. 11 shows a printing state by the heat pulses and heat data in the case of printing the pattern B in FIG. 5. The mark (o) denotes heat data. When no heat data exists at the upper and lower positions of the first dot, the heat can easily escape in the vertical direction (refer to FIG. 11(*b*)) and it is difficult to certainly print. This drawback can be prevented by slightly heating by the A data the upper and lower positions at which the heating energies escape with respect to the first dot of a lateral line such that no other dot exists in the upper and lower directions like the pattern B in FIG. 5. By this method, the first dot can be surely heated and the high quality printing is derived.

The AMA$^3$ control is particularly suitable in the high speed printing mode and, further, it is particularly effective at the ordinary temperature for the AMA control mentioned above.

(A$^3$MA control)

Figure 12:
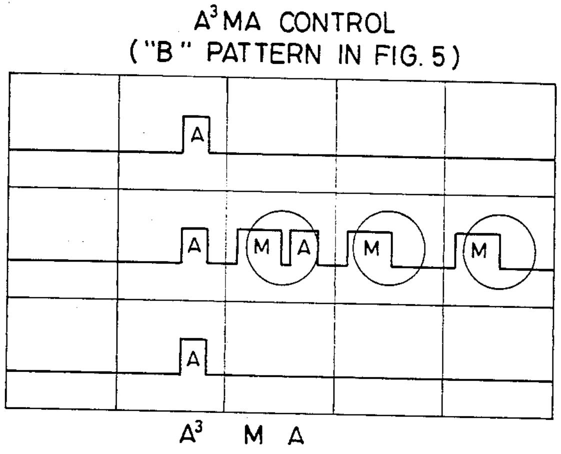
FIG. 12 is an explanatory diagram for $A^3MA$ control to heat the portion of the pattern B in FIG. 5.

The A$^3$MA control relates to an example of application of the foregoing AMA$^3$ control. FIG. 12 shows the A$^3$MA control in the case of printing the pattern B in FIG. 5. According to the method of the A$^3$MA control, the peripheral temperature of the dot to be printed is raised before the printing.

(A$^2$AMA control)

Figure 13:
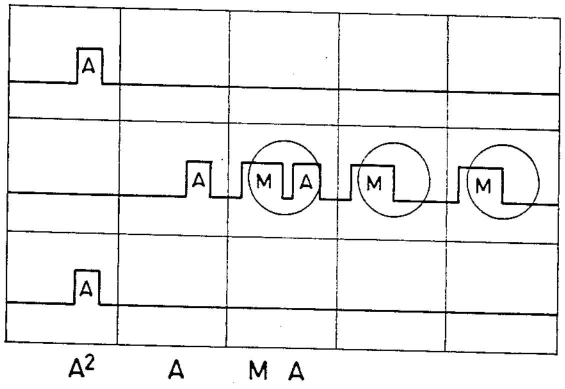
FIG. 13 is an explanatory diagram for $A^2AMA$ control to heat the portion of the pattern B in FIG. 5.

FIG. 13 likewise shows the A$^2$AMA control when printing the pattern B in FIG. 5. In the A$^2$AMA control, the head is slowly warmed from the timing which is preceding to the printing dot by two dots.

(A$^3$MA$^3$ control)

Figure 14:
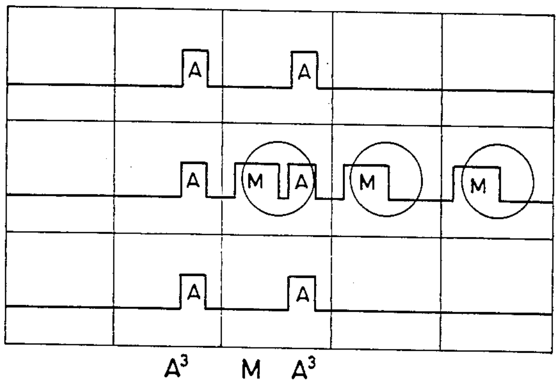
FIG. 14 is an explanatory diagram for $A^3MA^3$ control to heat the portion of the pattern B in FIG. 5.

FIG. 14 shows a printing state by the heat pulses and heat data in the case of printing the pattern B in FIG. 5 by the A$^3$MA$^3$ control The mark (o) denotes heat data. At low temperatures, the heat diffusion also occurs in the AMA$^3$ control described in FIG. 11. Therefore, it is necessary to apply higher heating energies than those in the AMA$^3$ control. For this purpose, in the A$^3$MA$^3$ control, the peripheral temperature of the dot to be printed is previously raised and the position where the heat can escape is heated by the A data. By this method, the first dot can be certainly heated at low temperatures.

(AA$^3$MA control)

Figure 15:
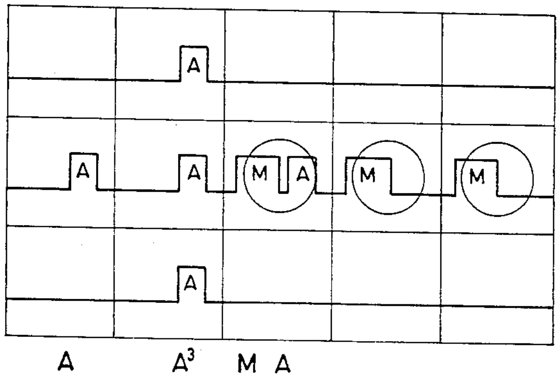
FIG. 15 is an explanatory diagram for $AA^3MA$ control to heat the portion of the pattern B in FIG. 5.

As an example of application of the foregoing A$^3$MA$^3$ control, FIG. 15 similarly shows the AA$^3$MA control when printing the pattern B in FIG. 5. According to the AA$^3$MA control, the central and peripheral positions of the printing dot of the head are previously warmed from the timing which is preceding to the printing dot by two dots, thereby increasing the heating energies to be applied.

(A$^2$AMA$^3$ control)

Figure 16:
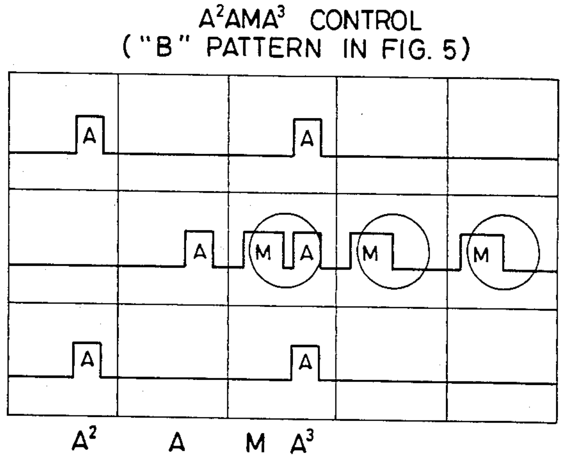
FIG. 16 is an explanatory diagram for $A^2AMA^3$ control to heat the portion of the pattern B in FIG. 5.

FIG. 16 likewise shows the A$^2$AMA$^3$ control for the pattern B in FIG. 5. In the A$^2$AMA$^3$ control, the peripheral positions of the printing dot of the head are previously warmed from the timing which is two-dot preceding to the dot to be heated, thereby increasing the heating energies to be applied.

(AM underline control)

An underline is printed by continuously heating two vertical dots At this time, when the AMA control shown in FIG. 6 is used, the heat is accumulated in the head. To prevent this, the average value of the heating energies to be applied needs to be reduced. However, since the widths of A data and M data also serve as the heating periods of time for characters, the heat pulse widths cannot be reduced. Therefore, by heating the M data every other dot and by deleting the post A data in the AMA control, the heating energies to be applied are reduced and the heat accumulation is suppressed.

Figure 17:
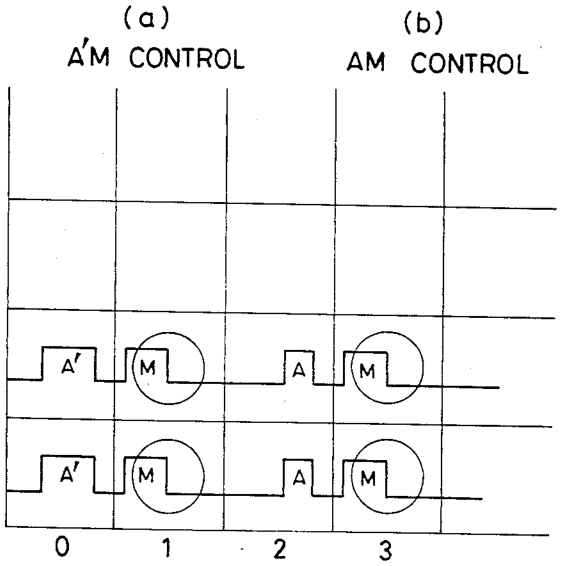
FIG. 17 is an explanatory diagram for AM and A'M underline control.

FIG. 17(*b*) shows the foregoing AM underline control.

(A'M underline control)

In the AM underline control, the applying energy at the first dot of the underline from which the heat accumulation was eliminated is low. Therefore, there is a possibility such that the lack of printing at the first dot occurs at low temperatures. To correct this drawback, the data which is obtained by widening the pulse width of A in the AM underline control is set to A' and used to preheat the first dot. Thus, the first dot of the underline can be more certainly printed.

FIG. 17(*a*) shows the A'M control.

(One serial/lateral dot control in the AMA control)

FIG. 18 shows a printing state by the heat pulses and heat data in the case of printing a one serial/parallel dot line by the AMA control. The mark (o) denotes heat data. In the case of the continuous heat data, only the M data is ordinarily heated. Therefore, particularly, as shown in FIG. 18(*b*), the heating energies escape in the directions as shown by arrows at low temperatures, so that there is a possibility such that the printing concentration is small or is not performed.

To eliminate such a drawback, the A data is added so as to obtain the sufficient heating energies even if the heat escaped. This method is shown in FIG. 18(*a*).

Figures 2, 19:
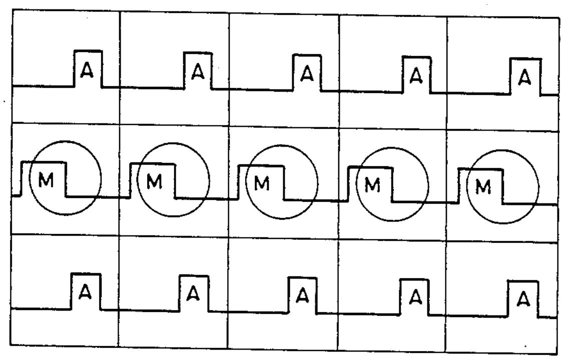
Figures 3, 19:
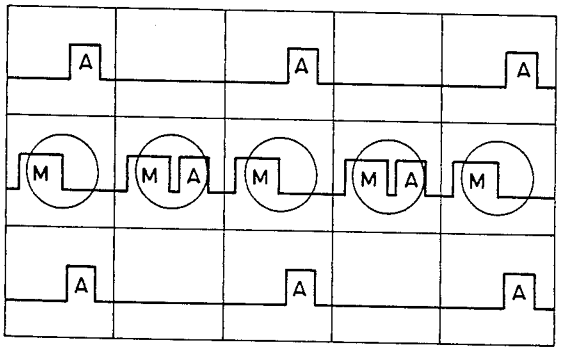

FIGS. 19-1 to 19-3 show examples of the application of this control.

FIG. 19-1 shows the case where the A data is added at the interval of one dot.

FIG. 19-2 shows the case where the A data is added to the upper and lower lines of the line where the dot information to be printed exists, namely, in the upper and lower heat escaping directions.

FIG. 19-3 shows the case of a combination of FIG. 18(*a*) and FIG. 19-2 in which the A data is added at intervals of one dot.

("  "-shape dot control)

Figure 20:
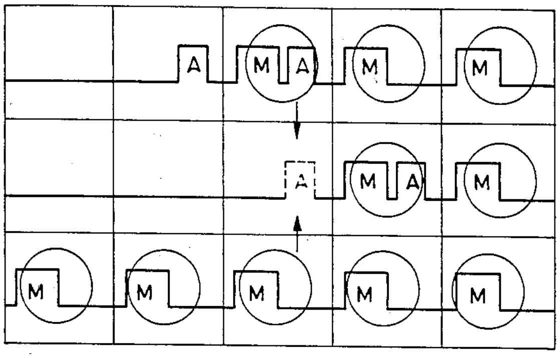
FIG. 20 is an explanatory diagram for "⊐"-shape dot control to heat the portion of the pattern D in FIG. 5.

FIG. 20 shows a printing state by the heat pulses and heat data in the case of printing the pattern D in FIG. 5 at a high quality. In the heating method by the AMA control shown in FIG. 6, the A data is heated from the timing before the actual CG data and the head is warmed. However, in the case of FIG. 20, since the heat escapes in the directions indicated by arrows, there is no need to warm the head. Therefore, when the M data exists in the upper and lower directions, the first A data (indicated by broken lines) at the center is not heated.

("  "-shape dot control)

Figure 21:
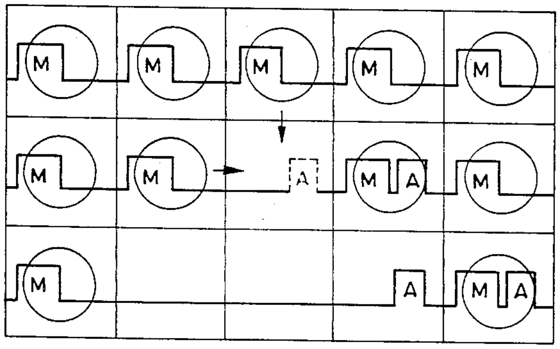
FIG. 21 is an explanatory diagram for "⊓"-shape dot control to heat the portion of the pattern E in FIG. 5.

FIG. 21 shows a printing state in the case of printing the pattern E in FIG. 5. In this case, since the heat moves in the directions indicated by arrows, the A data (shown by broken lines) does not need to be heated.

The "⊔"-shape dot control and the "□"-shape (the center is a blank) dot control are also similarly executed and their drawings are omitted here.

("□"-shape dot control)

Figure 22:
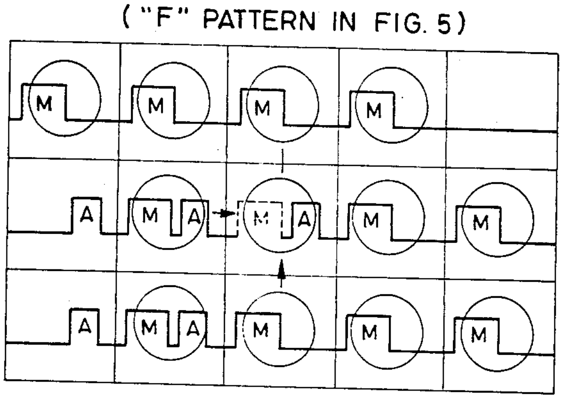
FIG. 22 is an explanatory diagram for "□"-shape dot control to heat the portion of the pattern F in FIG. 5.

FIG. 22 shows a printing state in the case of printing the pattern F in FIG. 5. In the diagram, the center is a dot to be printed and differs from the "□"-shape in which the center is a blank. The heating energies move toward the center from the upper, lower, and front positions thereof. Therefore, when the M data is heated, the heating energies are concentrated and there is a possibility such that a variation in printing occurs. However, since the printing can be performed only when the heating is executed, the A data is heated to a degree such as not to form a blank portion, thereby reducing the heating energies and uniforming the whole energy.

($P'P^3M$ control)

Figure 23:
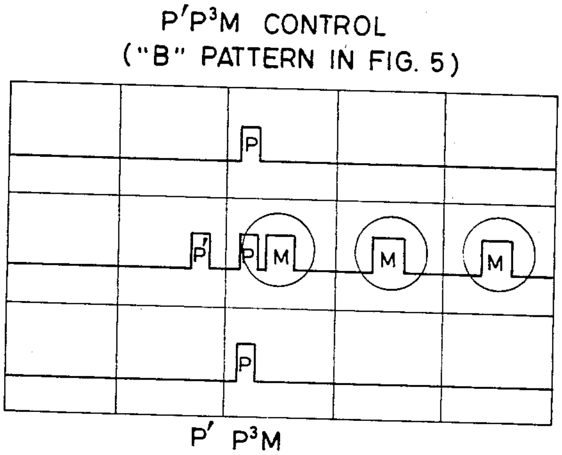
FIG. 23 is an explanatory diagram for $P'P^3M$ control to heat the portion of the pattern B in FIG. 5.

FIG. 23 shows a printing state by the heat pulses and heat data in the case of printing the pattern B in FIG. 5. The mark (o) denotes heat data. In the case of the first dot when no heat data exists at the upper and lower positions, the heat is diffused in the upper and lower directions, so that it is difficult to certainly print. Therefore, by heating the heat escaping positions by the P data, the diffusion of the heat can be prevented and the first dot can be certainly heated. In this case, the pulse widths of the P and P' data are different.

This $P'P^3M$ control is effective at high or ordinary temperatures in the case of the P'PM control which is suitable in the low speed printing mode.

($P'P^3M$ control)

Figure 24:
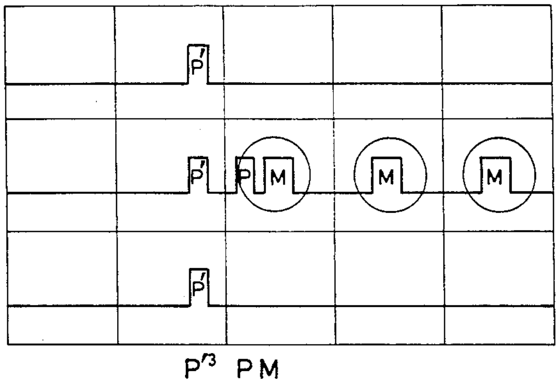
FIG. 24 is an explanatory diagram for $P'^3PM$ control to heat the portion of the pattern B in FIG. 5.

As an example of application of the $P'P^3M$ control, the $P'^3PM$ control is shown in FIG. 24. The $P'^3PM$ control relates to a method whereby the peripheral temperature of the dot to be printed is previously raised.

P'PMP' control)

Figure 25:
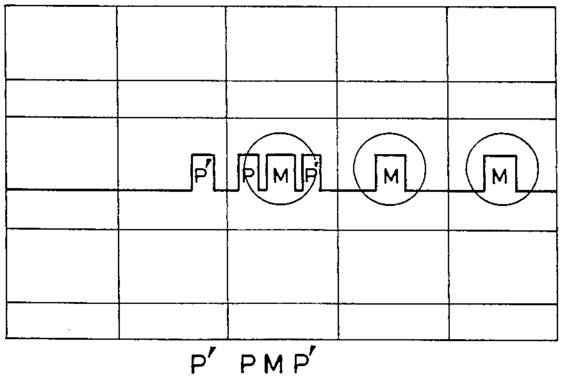
FIG. 25 is an explanatory diagram for P'PMP' control to heat the portion of the pattern B in FIG. 5.

FIG. 25 shows the P'PMP' control. According to this control, the printing energy for the first dot in the P'PM control which has been described in FIG. 8 is increased by the amount corresponding to the second P' data, thereby correcting the diffusion of the heating energy which is applied to the first dot. Thus, the printing of a good quality can be derived.

$P'PMP'2$ control)

Figure 26:
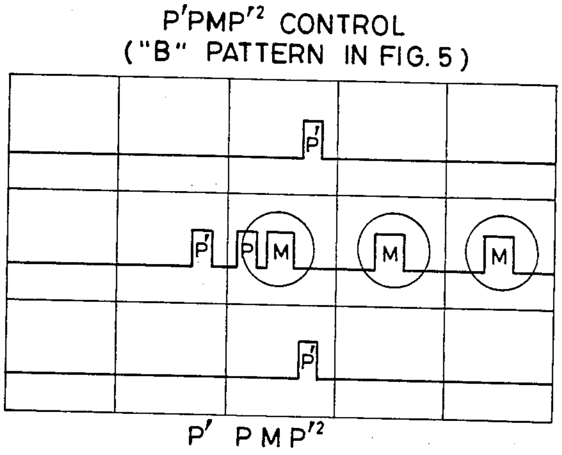
FIG. 26 is an explanatory diagram for $P'PMP'^2$ control to heat the portion of the pattern B in FIG. 5.

FIG. 26 shows the $P'PMP'^2$ control. According to this control, the heat diffusion at the upper and lower peripheral positions of the M data of the first dot in the P'PM control which has been described in FIG. 8 is prevented by two P' data, thereby protecting P'PM.

($P^2P'PM$ control)

Figure 27:
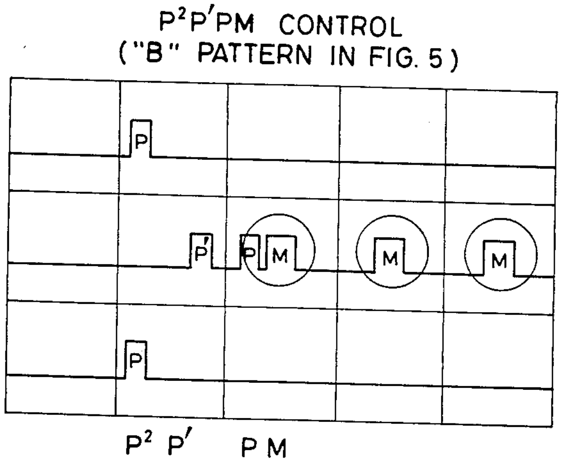
FIG. 27 is an explanatory diagram for $P^2P'PM$ control to heat the portion of the pattern B in FIG. 5.

FIG. 27 shows the $P^2P'PM$ control. According to this control, there is an effect such that by applying two P data just before the execution of the P'PM control, the head is previously warmed, thereby suppressing the heat diffusion which occurs at the start of the P'PM control.

P'P$^3$MP'$^3$ control)

Figure 28:
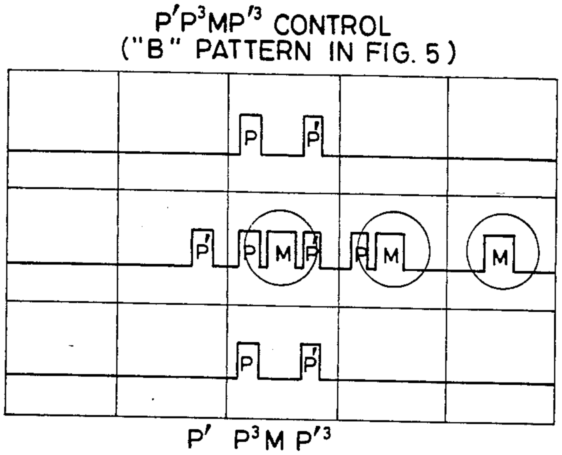
FIG. 28 is an explanatory diagram for $P'P^3MP'^3$ control to heat the portion of the pattern B in FIG. 5.

FIG. 28 shows a printing state by the heat pulses and heat data in the case of printing the pattern B in FIG. 5 by the P'P$^3$MP'$^3$ control. The mark (o) denotes heat data. In the P'PM (3, 2, 1) control shown in FIG. 9, it is considered that in the case of the first dot when no heat data exists at the upper and lower positions, the heat is diffused in the upper and lower directions, so that it is difficult to certainly print. Therefore, by heating the heat diffusing positions by the P data and P' data, the heat diffusion can be prevented and the first dot can be further surely heated.

The P'P$^3$MP'$^3$ control is particularly suitable in the low speed printing mode.

(P'$^3$PMP'$^3$ control)

Figure 29:
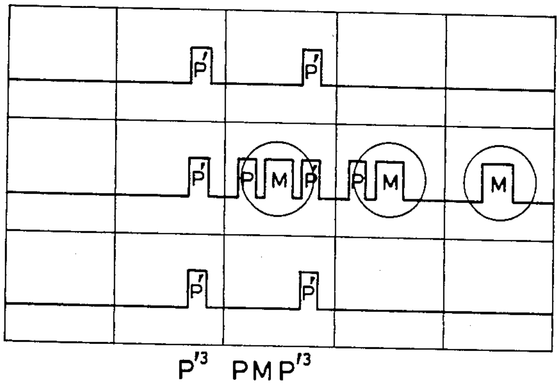
FIG. 29 is an explanatory diagram for $P'^3PMP'^3$ control to heat the portion of the pattern B in FIG. 5.

As an example of application of the P'P$^3$MP'$^3$ control. FIG. 29 shows the P'$^3$PMP'$^3$ control. When the P' data is heated twice in the P'PM (3, 2, 1) control shown in FIG. 9, the head is warmed at the first time at the upper or lower position. The diffusion of the heat of the M data is prevented at the second time. In this manner, the heating efficiency is raised.

P$^2$P'PMP'$^3$ control)

Figure 30:
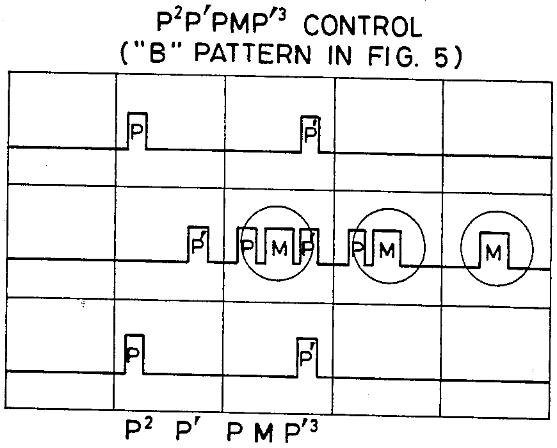
FIG. 30 is an explanatory diagram for $P^2P'PMP'^3$ control to heat the portion of the pattern B in FIG. 5.

FIG. 30 shows the P$^2$P'PMP'$^3$ control. According to this control, before the P' data is heated at the first time in the P'PM (3, 2, 1) control shown in FIG. 9, in order to set the head temperature to the proper value, the P data at the upper and lower positions are preheated, and, at the P' data just after the M data, the P' data at the upper and lower positions are further heated to prevent the heat diffusion in the upper and lower directions, thereby uniforming the printing energies PP'$^3$PMP' control)

Figure 31:
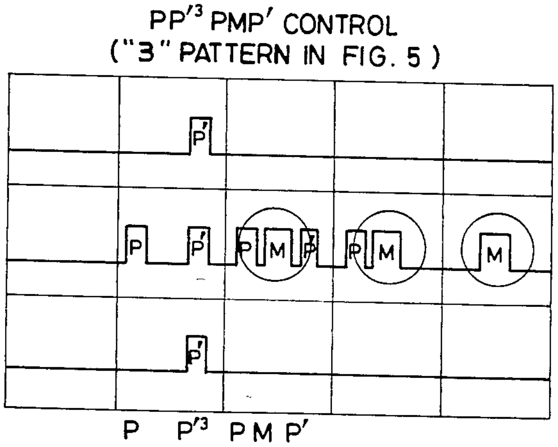
FIG. 31 is a diagram for $PP'^3PMP'$ control to heat the portion of the pattern B in FIG. 5.

FIG. 31 shows the PP'$^3$PMP' control. In the case of the first dot at low temperatures, the heating efficiency of the P' data for the preheat in the P'PM (3, 2, 1) control shown in FIG. 9 deteriorates due to the heat diffusion. Therefore, according to the PP'$^3$PMP' control, in order to improve the heating efficiency, the P data is previously heated and the P' data at the upper and lower positions are then heated, thereby preventing the heat diffusion.

(One serial/lateral dot control in the P'PM control)

Figure 32:
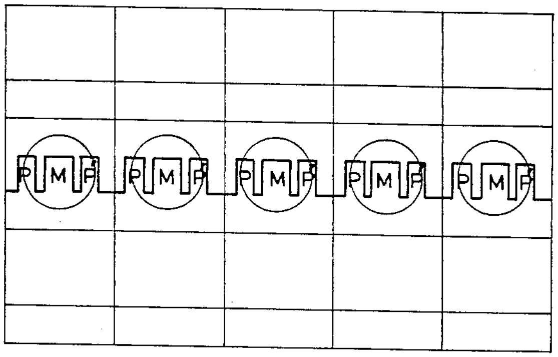
FIG. 32 is an explanatory diagram for one serial/lateral dot control in the P'PM control to heat the portion of the pattern C in FIG. 5.

FIG. 32 shows a printing state by the heat pulses and heat data in the case of printing the pattern C in FIG. 5. The mark (o) denotes heat data. In the case of the continuous heat data, only the M data is ordinarily heated. Therefore, particularly, in the low speed printing mode at low temperatures, the heat escapes in the upper and lower directions, so that there is a possibility such that the printing concentration is small or the printing is not performed.

Therefore, in order to obtain the sufficient heating energies even if the heat escaped, the P data and P' data are added in the same heat cycle as that of the M data. This method is shown in FIG. 32.

Figures 1, 33:
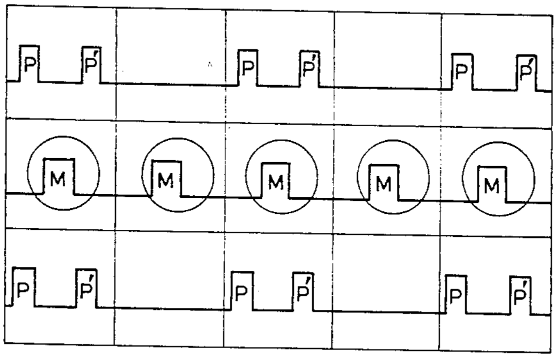
Figures 2, 33:
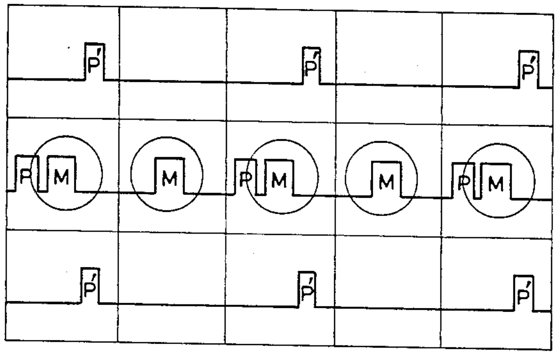
Figures 3, 33:
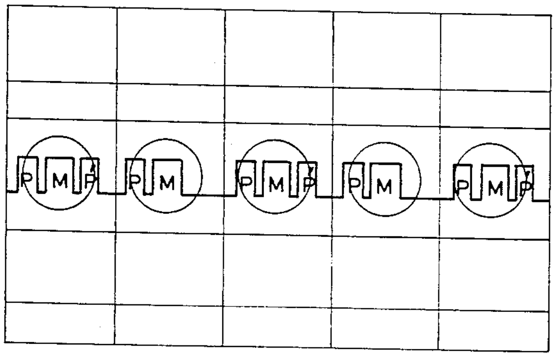
Figures 4, 33:
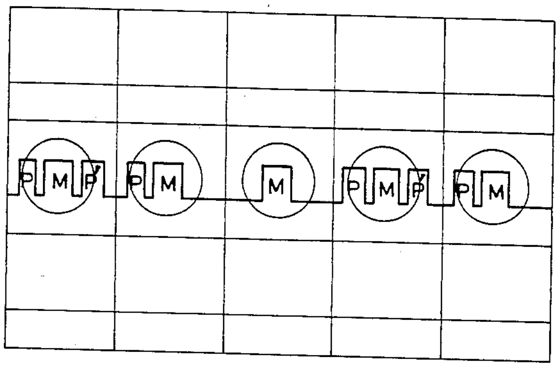
Figures 5, 33:
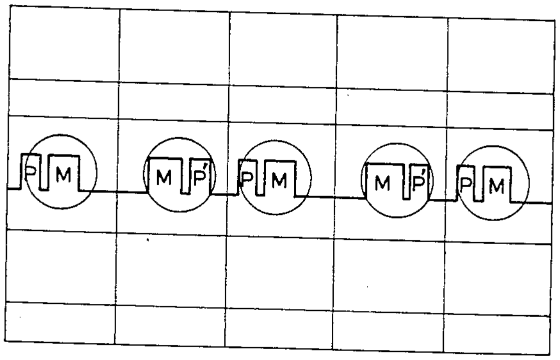

FIGS. 33-1 to 33-5 show examples of application of this control.

FIG. 33-1 shows the case where the P data and P' data are added at intervals of one dot (within one heat cycle) in the upper and lower heat escaping directions.

FIG. 33-2 shows the case where the P data is added to the centers of the printing dots at intervals of one dot and at the same time, the P' data is added at intervals of one dot in the upper and lower heat escaping directions.

FIG. 33-3 shows the case where the P data is added to the centers of the printing dots and at the same time, the P' data is added at intervals of one dot.

FIG. 33-4 shows the case where the control is switched at intervals of three dots The first dot is heated by the P data, M data, and P' data. The second dot is heated by the P data and M data. The third dot is heated by only the M data. These heating operations are repeated.

FIG. 33-5 shows the case where the P data and P' data are alternately added to the centers of the printing dots.

Each of the foregoing controls will now be explained hereinbelow with reference to flowcharts.

In the following flowchart, the "data heat" means that a drive pulse is given and whether data is actually printed or not is determined in dependence on whether the data has been turned on or off when the drive pulse was given.

Flowchart for the AMA control)

Figure 34:
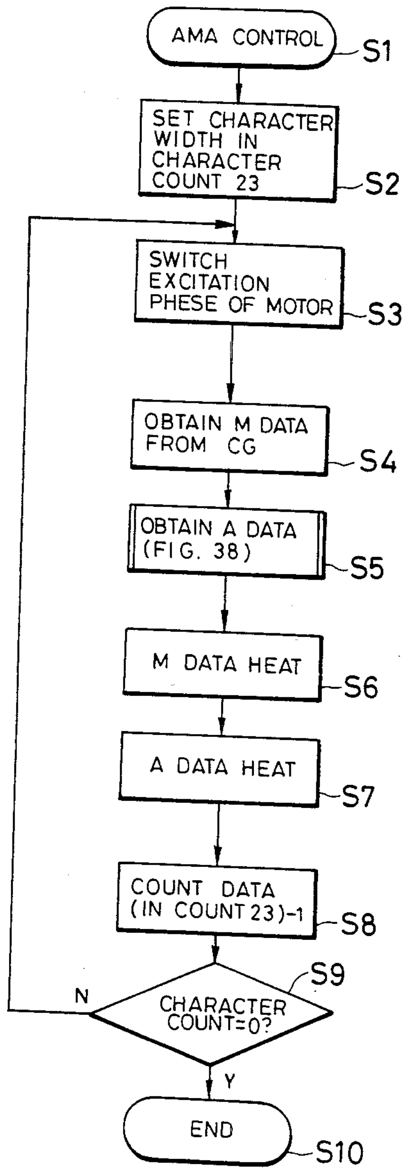
FIG. 34 is a flowchart for the AMA control shown in FIG. 6.

FIG. 34 is a control flowchart for the AMA control shown in FIG. 6. When the printing is instructed from a key of the keyboard 1 shown in FIG. 1 or the like, the printing is started. The processing routine for the AMA control in step S1 is started. In step S2, a width of character to be printed (i.e., a length in the lateral direction shown in FIG. 5; in this case, 32 dots) is fetched from the CG (ROM 10 or CG cartridge 18) and set into the character count unit 23 in the RAM 11. The character width can be changed in accordance with a font or the like. In step S3, the excitation phase of the motor is switched to move the carriage 5 having the thermal head 6 by the motor 22 by only the distance of one heat cycle corresponding to the width of one frame shown in FIGS. 6 to 33-5. Namely, the carriage advances by the distance corresponding to one heat cycle by executing the switching operation in steps S3 to S9 once. In the next step S4, the substantial printing data, i.e., the M data corresponding to the mark (o) shown in FIG. 5 is obtained from the CG.

Then, the A data is derived in step S5 to obtain the A data, which will be explained hereinafter. In step S6, the M data which was actually obtained in step S4 is heated. In step S7, the A data is heated. However, since the M data does not exist at first, the M data is heated (step S6) in the control. However, the M data is actually printed for the first time in step S6 in the next cycle. Subsequently, in step S8, the count data in the character count unit 23 is decreased by "1". In step S9, a check is made to see if the character count value is "0" or not. If it is "0", this means that the character to be printed has been finished. Therefore, the processing routine ends in step S10.

(Flowchart for the PPM Control)

Figure 35:
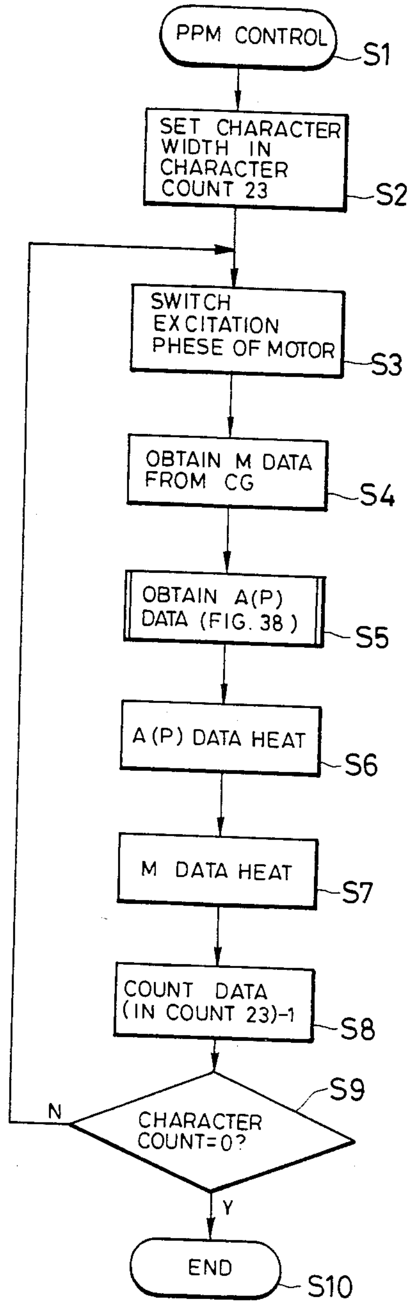
FIG. 35 is a flowchart for the PPM control shown in FIG. 7.

FIG. 35 is a flowchart for the PPM control shown in FIG. 7. The printing is started in step S1. A width in character to be printed is obtained from the CG and set into the character count unit in the RAM in step S2. The excitation phase of the stepping motor is switched in step S3. The M data is obtained from the CG in step S4. These processes are the same as those in FIG. 34. In the next step S5, the A (P) data is made by use of the previous M data, the present M data, and the next M data. This routine will be explained hereinafter. However, the A data is used in place of the P data for convenience of explanation. The A (P) data obtained in step S5 is heated. The M data obtained in step S4 is heated in step S7. The character count value is decreased by "1" in step S8. In step S9, a check is made to see if the character count value is "0" or not. If it is "1", the processing routine is returned to step S3. If it is "0", this means that the printing of one character is finished, so that the processing routine ends in step S10.

(Flowchart for P'PM Control)

Figure 36:
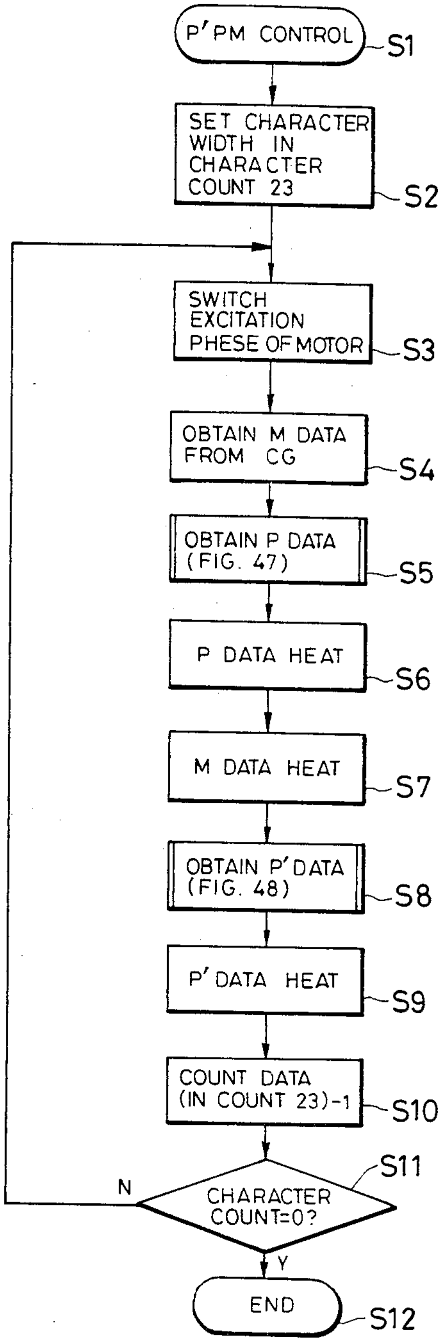
FIG. 36 is a flowchart for the P'PM control shown in FIG. 8.

FIG. 36 is a flowchart for the P'PM control shown in FIG. 8. Since the processes in steps S1 to S4 are the same as those in FIGS. 34 to 36, their descriptions are omitted. In step S5, the P data is produced by the previous M data and the present M data. This processing routine will be explained hereinlater. In step S6, the P data formed in step S5 is heated. In step S7, the M data obtained in step S4 is heated. In step S8, the P' data is made by the present M data and the next M data. This processing routine will be explained hereinlater. In step S9, the P' data obtained in step S8 is heated. In step S10, the character count value is decreased by "1". Practically speaking, the P' data is printed in the first cycle and the P and M data are printed in the next cycle. In step S11, a check is made to see if the character count value is "0" or not. If it is "1", the processing routine is returned to step S3. If it is "0", this means that the printing of one character has been finished, so that the processing routine ends in step S12.

(Flowchart for the P'PM (3, 2, 1) Control)

Figure 37:
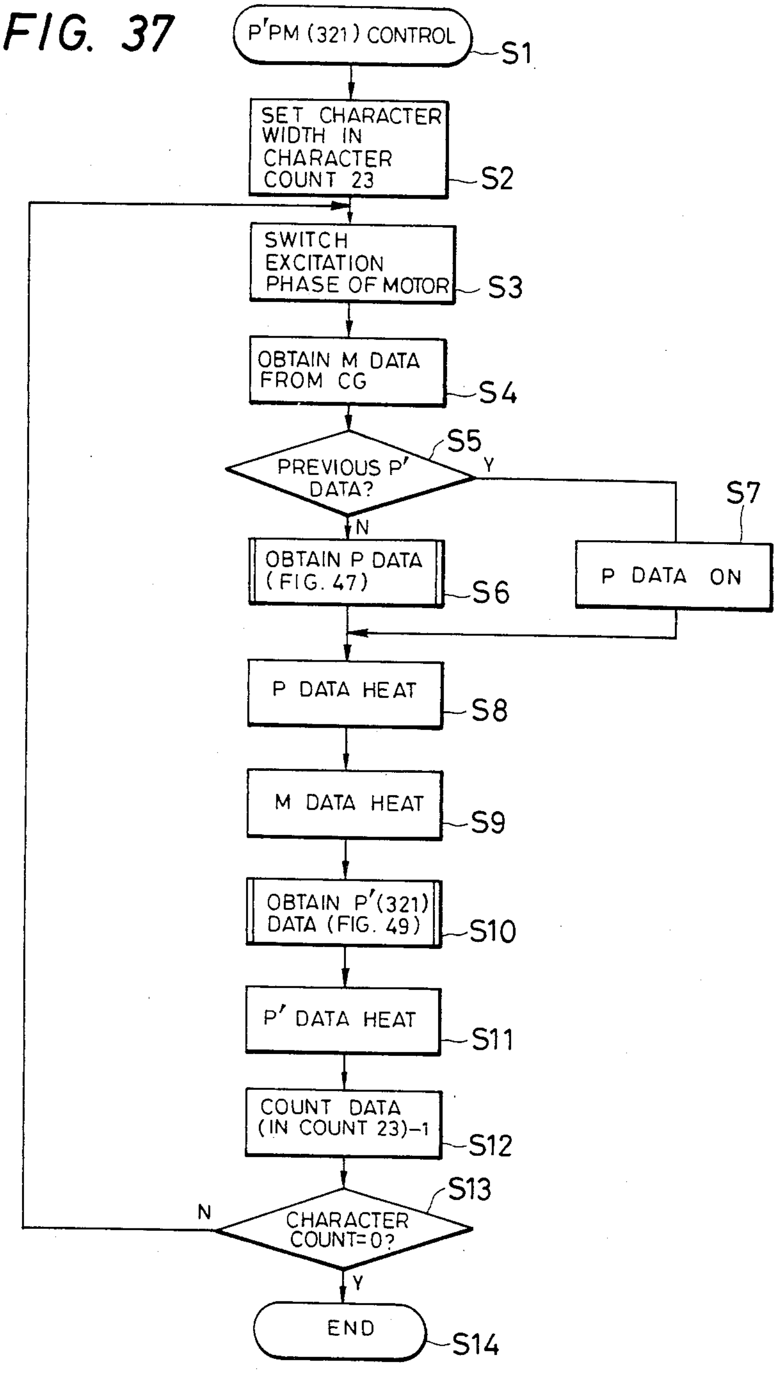
FIG. 37 is a flowchart for the P'PM (3,2,1) control shown in FIG. 9.

FIG. 37 shows a flowchart for the P'PM (3, 2, 1) control shown in FIG. 9. Since the processes in steps S1 to S4 are the same as those mentioned above, their descriptions are omitted. In step S5, the presence or absence of the previous P' data is checked. If the previous P' data exists, the P data is turned on in step S7. Namely, this means that when the P data is then heated, it is printed. Next, step S8 follows. If the previous P' data does not exist, the P data is formed by the previous M data and the present M data in step S6 (which will be explained hereinlater). In step S8, the P data formed in steps S6 and S7 is heated. In step S9, the M data obtained in step S4 is heated. In step S10, the P' data is produced by the previous M data, the present M data, and the next M data (which will be explained hereinlater). In step S11, the P' data obtained in step S10 is heated. In step S12, the character count value is decreased by "1". In step S13, a check is made to see if the character count value is "0" or not. If it is not "0", the processing routine is returned to step S3. If it is "0", this means that the printing of one character has been finished, so that the processing routine ends in step S14.

(Flowchart for the Control to Obtain the A Data)

Figure 38:
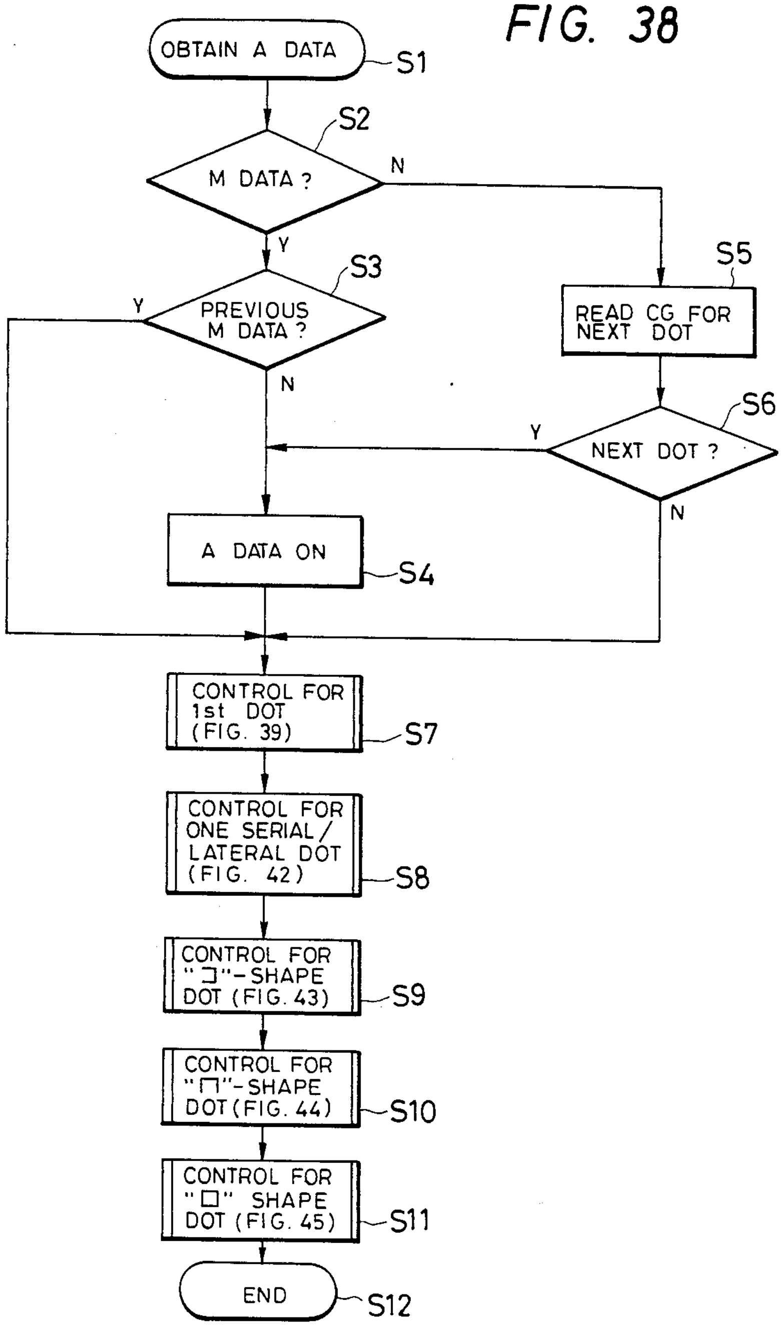
FIG. 38 is a control flowchart for the portion to obtain the A data in the AMA control.

FIG. 38 is a flowchart for the step of obtaining the A data (S5 in FIG. 34) in the AMA control. When the processing routine to obtain the A data in step S1 is started, a check is made in step S2 to see if the M data exists or not at the printing position of the printing head at the present excitation phase which was switched in the excitation phase switching step S3 in FIG. 34 (hereinafter, this M data is referred to as the present M data). If it exists, the processing routine advances to step S3 and a check is made to see if the previous M data (the dot which is preceding to the present printing position by one dot) exists or not. If it does not exist, the A data is turned on in step S4. The turn-on of the A data means that the A data is actually printed by heating it in step S7 in FIG. 34. In this case, the latter A data in the AMA is formed. If the previous M data exists in step S3, this means that the M data continuously exists, so that step S7 follows.

On the other hand, if the present M data does not exist in step S2, step S5 follows and the CG for the next dot is previously read. This read data is set to the next M data. In step S6, the presence or absence of the next M data is checked. If the next M data exists, the A data is turned on in step S4. The A data formed in this step is the first A data in the AMA. If the next M data does not exist in step S6, step S7 follows.

In step S7, the first dot is controlled (which will be explained in conjunction with FIG. 39).

In step S8, the one serial/lateral dot control is executed (which will be explained in FIG. 42).

In step S9, the "コ"-shape dot control is performed (which will be explained in FIG. 43).

In step S10, the "ヮ"-shape dot control is executed (which will be explained in FIG. 44).

In step S11, the "□"-shape dot control is carried out (which will be explained in FIG. 45).

The processing routine ends in step S12.

(Flowchart for Control for the First Dot in the AMA Control)

Figure 39:
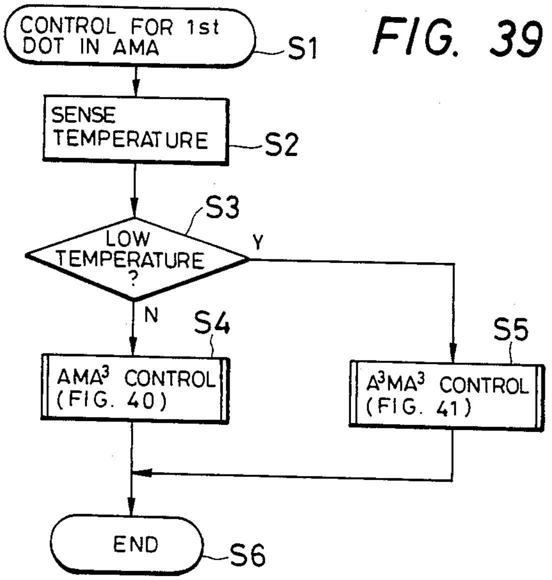
FIG. 39 is a control flowchart for the first dot in the AMA control.

FIG. 39 is a flowchart showing the control for the first dot in the AMA control. In step S1, the control is started. In step S2, the ambient temperature of the apparatus is measured by the temperature measurement circuit (13 in FIG. 2). In step S3, a check is made to see if the temperature is low or not. If it is low, the $A^3MA^3$ control is executed in step S5. Step S6 then follows. If it is not low, the $AMA^3$ control is performed in step S4 and the control ends in step S6.

(Flowchart for the $AMA^3$ Control)

Figure 40:
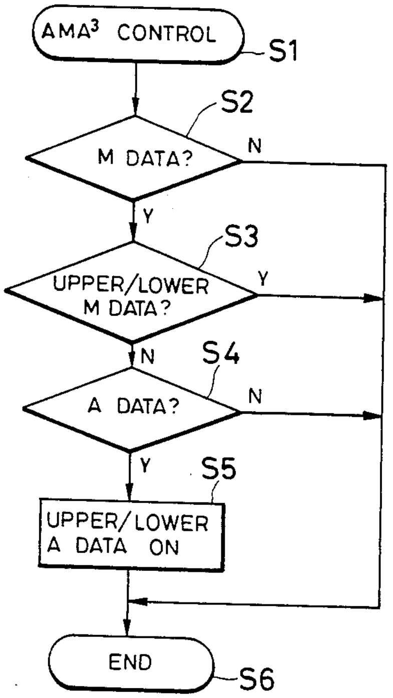
FIG. 40 is a flowchart for the $AMA^3$ control shown in FIG. 11.

FIG. 40 is a flowchart showing the $AMA^3$ control. In this case, the control shown in FIG. 11 is cited as an example.

In step 1, the control is started. In step S2, the presence or absence of the M data is checked. If the M data does not exist, step S6 follows. If it exists, a check is made in step S3 to see if the M data exists at the upper and lower positions or not. If either one of or both of the M data exist, step S6 follows. If no M data exists, the presence or absence of the A data is checked in step S4. If the A data does not exists, step S6 follows. If the A data exists, the A data at the upper and lower positions are turned on in step S5 and the processing routine ends in step S6.

(Flowchart for the $A^3MA^3$ Control)

Figure 41:
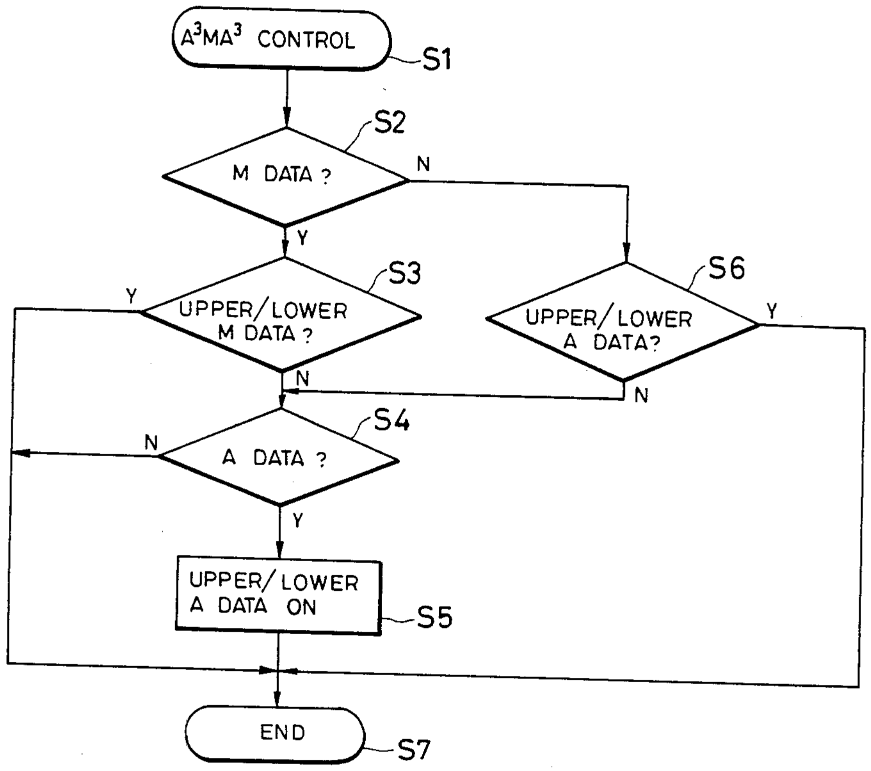
FIG. 41 is a flowchart for the $A^3MA^3$ control shown in FIG. 14.

FIG. 41 shows a flowchart for the $A^3MA^3$ control. In this case, the control shown in FIG. 14 is cited as an example.

In step S1, the control is started. In step S2, the presence or absence of the M data is checked. If the M data does not exist, step S6 follows. If the M data exists, a check is made in step S3 to see if the M data at the upper and lower positions exist or not. If either one of or both of the M data exist, step S7 follows. If no M data exists, the presence or absence of the A data is checked in step S4. If the A data does not exist, step S7 follows. If it exists, the A data at the upper and lower positions are turned on in step S5. Then, step S7 follows.

In step S6, the presence or absence of the A data at the upper and lower positions is checked. If no A data exists, step S4 follows. If they exist, step S7 follows and the control ends.

(Flowchart for the One Serial/Lateral Dot Control in the AMA Control)

Figure 42:
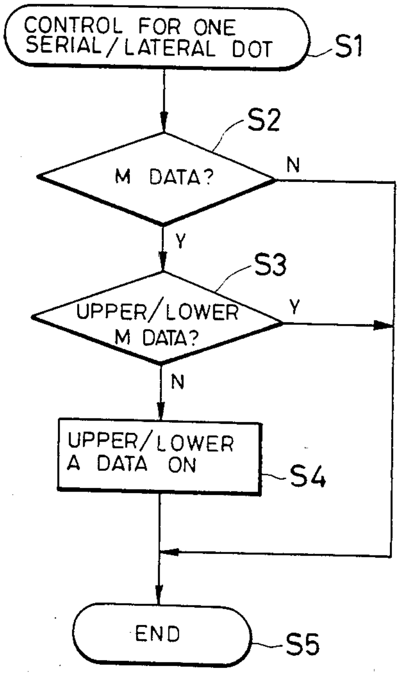
FIG. 42 is a control flowchart for one serial/lateral dot in the AMA control shown in FIG. 18.

FIG. 42 is a flowchart showing the one serial/lateral dot control in the AMA control. In this case, the control shown in FIG. 18 is cited as an example.

In step S1, the control is started. In step S2. a check is made to see if the M data exists or not. If the M data does not exist, step S5 follows. If the M data exists, the presence or absence of the M data at the upper and lower positions is checked in step S3. If either one or of both of the M data at the upper and lower positions exist, step S5 follows. If no M data exists, the A data at the upper and lower positions (in the cases in FIGS. 19-1 to 19-3) are turned on in step S4. The processing routine ends in step S5.

(Flowchart for the "⊐"-Shape Dot Control)

Figure 43:
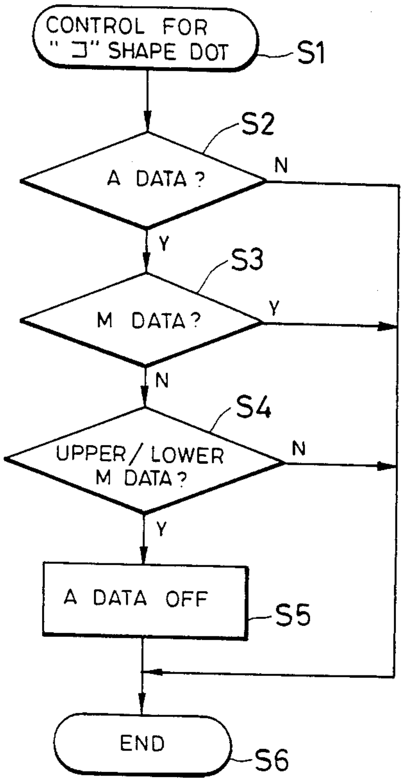
FIG. 43 is a flowchart for the "⊐"-shape dot control.

FIG. 43 is a flowchart for the "⊐"-shape dot control. An example of this control already been described in FIG. 20. In step S1, the control is started. In step S2, the presence or absence of the A data is checked. If the A data does not exist, step S6 follows. If the A data exists, the presence or absence of the M data is checked in step S3. If the M data exists, step S6 follows. If the M data does not exist, the presence or absence of the M data at the upper and lower positions is checked in step S4. If no M data exists, step S6, follows. If they exist, the A data is turned off in step S5 and the control ends in step S6. Thus, the A data indicated by the broken lines shown in FIG. 20 is not printed and the "⊐"-shape is certainly printed.

(Flowchart of the "⊓"-Shape Dot Control)

Figure 44:
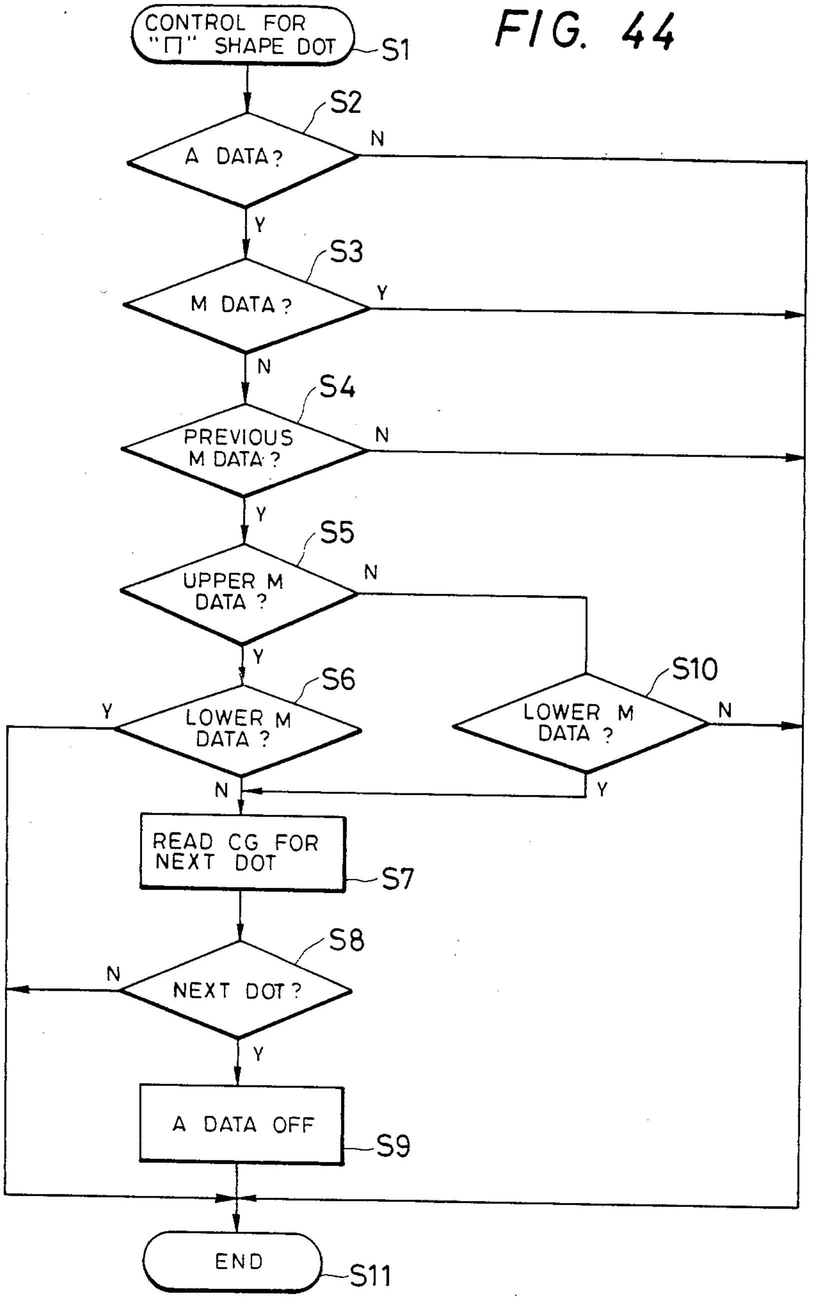
FIG. 44 is a flowchart for the "⊓"-shape dot control.

FIG. 44 is a flowchart for the "⊓"-shape dot control. An example of the control has already been described in FIG. 21. In step S1, the control is started. In step S2, the presence or absence of the present A data is checked. If the present A data does not exist, step S11 follows. If it exists, the presence or absence of the present M data is checked in step S3. If the present M data exists, step S11 follows. If the present M data does not exist, the presence or absence of the previous M data is checked in step S4. If the previous M data does not exist, step S11 follows. If the previous M data exists, the presence or absence of the M data at the upper position is checked in step S5. If the upper M data does not exist, step S10 follows. If it exists, the presence or absence of the M data at the lower position is checked in step S6. If the lower M data exists, step S11 follows. If it does not exist, the CG for the next dot is previously read in step S7. In step S8, the presence or absence of the M data for the next dot is checked. If it does not exist, step S11 follows. If the M data for the next dot exists, the A data is turned off in step S9 and step S11 follows.

In step S10, the presence or absence of the lower M data is checked. If it exists, step S7 follows. If it does not exist, step S11 follows and the control ends.

(Flowchart for the "□"-Shape Dot Control)

Figure 45:
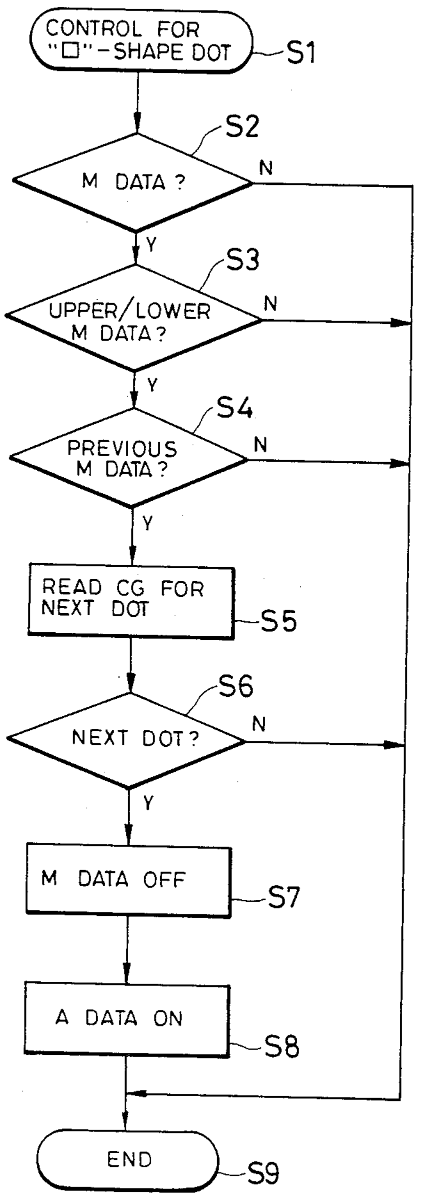
FIG. 45 is a flowchart for the "□"-shape dot control.

FIG. 45 is a flowchart for the "□"-shape dot control. An example of this control has already been described in FIG. 22.

In step S1, the control is started. In step S2, the presence or absence of the present M data is checked. If it does not exist, step S9 follows. If it exists, step S3 follows and the presence or absence of the M data at the upper and lower positions is checked. If either one of or both of the upper and lower M data do not exist, step S9 follows. If both of the upper and lower M data exist, the presence or absence of the previous M data is checked in step S4. If the previous M data does not exist, step S9 follows. If the previous M data exists, the CG for the next data is previously read in step S5. The presence or absence of the next dot is checked in step S6. If the next dot does not exist, step S9 follows. If the next dot exists, the upper and lower M data are turned off in step S7. In step S8, the A data is turned on. In step S9, the control ends. Namely, if the M data exist around the present M data which was checked in step S2, these M data are turned off. However, in this state, the center of the dot becomes a blank. Therefore, only the A data is turned on so as to avoid the concentration of the heating energies.

(Flowchart for the AM and A'M Underline Controls)

Figure 46:
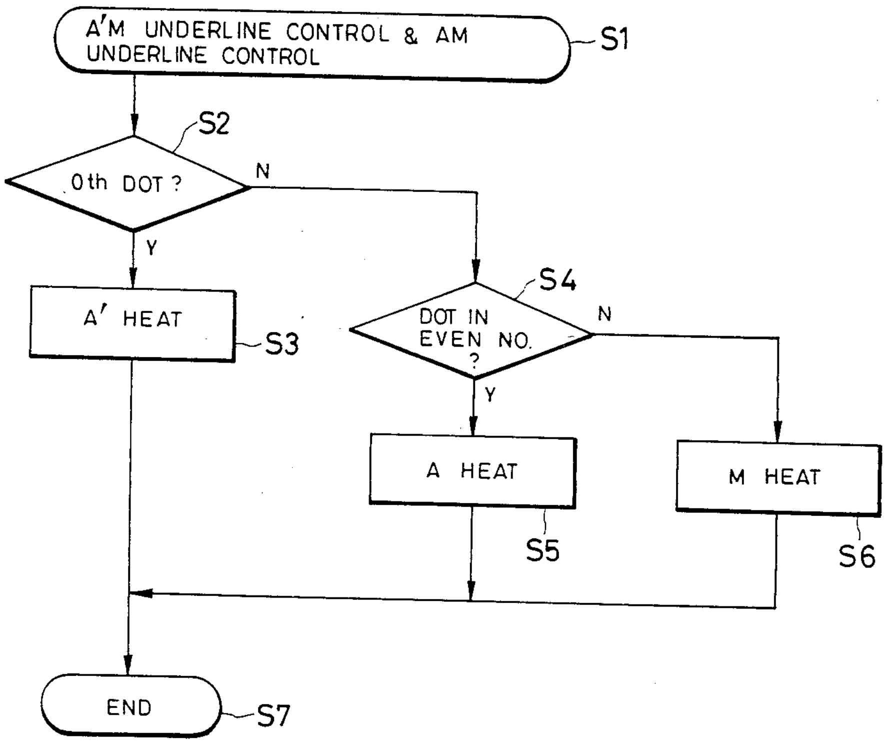
FIG. 46 is a flowchart for the AM and A'M underline control.

FIG. 46 is a flowchart for the AM underline control and the A'M underline control.

It is apparent that an underline or the like is instructed by designating the printing mode with an underline or by inputting the data of a character with an underline by operating the keys. The control is started in step S1 on the basis of these instructions. In step S2, a check is made to see if the dot is the 0th dot or not.

Namely, a check is made to see if the preheat for the first dot of an underline is executed or not. If NO, step S4 follows. If the preheat is performed, the A' data (whose pulse width and pulse position are different from those of the A data) is heated in step S3. Then, step S7 follows. In step S4, a check is made to see if the dot is the even number dot or not. If YES, the A data is heated in step S5 and step S7 follows. If the dot is the odd number dot, the M data is heated in step S6 and the control ends in step S7.

(Flowchart for the Control to Obtain the P Data)

Figure 47:
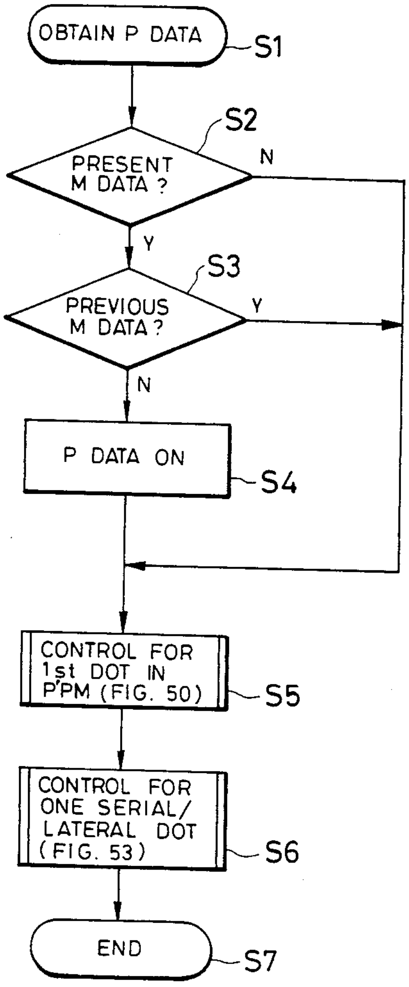
FIG. 47 is a flowchart to obtain the P data in the P'PM control.

FIG. 47 is a flowchart showing the process to obtain the P data in step S5 in the P'PM control shown in FIG. 36. The process to obtain the P data is started in step S1. In step S2, the presence or absence of the present M data is checked. If the present M data does not exist, step S5 follows. If it exists, the presence or absence of the previous M data is checked in step S3. If the previous M data exists, step S5 follows. If the previous M data does not exist, the P data is turned on in step S4.

In step S5, the first dot is controlled (which will be explained hereinlater in FIG. 50).

In step S6, one serial/lateral dot is controlled (which will be explained hereinlater in FIG. 51).

The processing routine ends in step S7.

(Flowchart for the Control to Obtain the P' Data)

Figure 48:
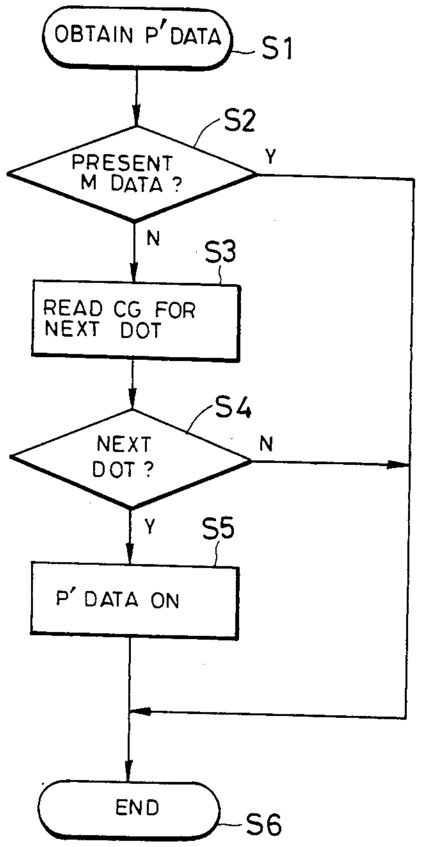
FIG. 48 is a flowchart to obtain the P' data in the P'PM control.

FIG. 48 is a flowchart for the process to obtain the P' data in the P'PM control which has been described in step S8 in FIG. 36. In step S1, the process to obtain the P' data is started. In step S2, the presence or absence of the present M data is checked. If the present M data exists, step S6 follows. If it does not exist, the CG for the next dot is previously read in step S3 and the read data is set to the next M data. In step S4, the presence or absence of the next dot (M data) is checked. If the next dot does not exist, step S6 follows. If it exists, the P' data is turned on in step S5 and the processing routine ends in step S6.

(Flowchart for the P'PM (3, 2, 1) Control)

Figure 49:
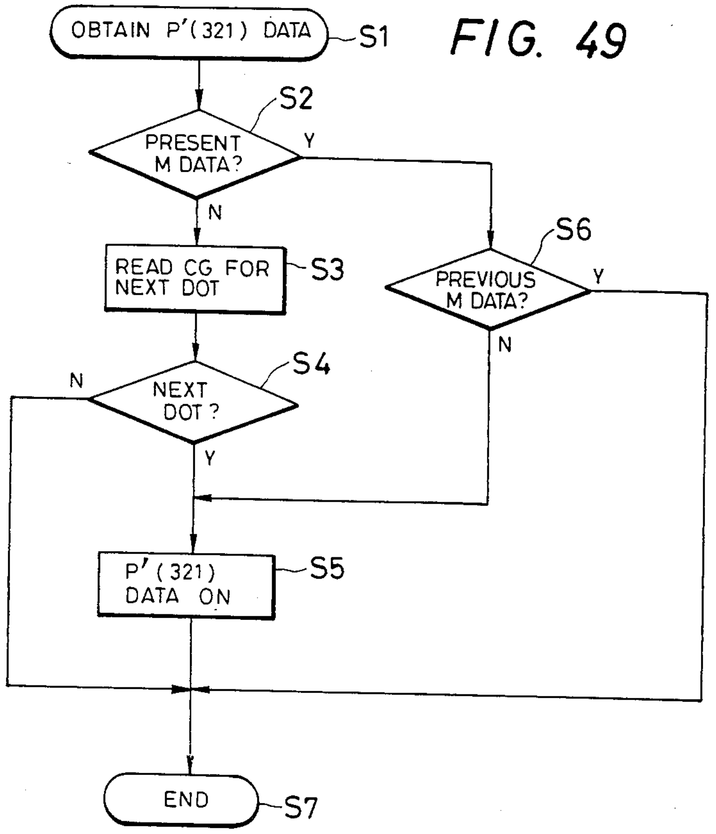
FIG. 49 is a flowchart to obtain the P' (3, 2, 1) data in the P'PM (3, 2, 1) control.

FIG. 49 is a flowchart for the process to obtain the P' (3, 2, 1) data in the P'PM (3, 2, 1) control described in step S10 in FIG. 37.

In step S1, the process to obtain the P' (3, 2, 1) data is started. In step S2, the presence or absence of the present M data is checked. If the present M data exists, step S6 follows. If the present M data does not exist, the CG for the next dot is previously read in step S3. In step S4, the presence or absence of the next dot (M data) is checked. If the next dot does not exist, step S7 follows. If the next dot exists, the P' (3, 2, 1) data is turned on in step S5 and step S7 follows.

In step S6, the presence or absence of the previous M data is checked. If it does not exist, step S5 follows. If it exists, the processing routine ends in step S7.

(Flowchart for the Control for the First Dot in the P'PM Control)

Figure 50:
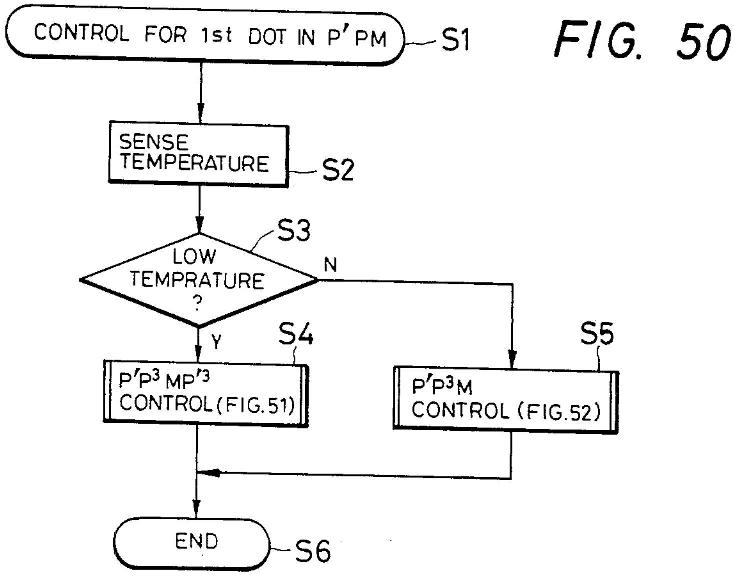
FIG. 50 is a flowchart showing the control of the first dot in the P'PM control.

FIG. 50 is a flowchart showing the control for the first dot in the P'PM control.

In step S1, the control is started. In step S2, the peripheral temperature of the apparatus is sensed by the temperature measurement circuit (13 in FIG. 2). In step S3, a check is made to see if the temperature is low or not. If it is not low, the $P'P^3M$ control is performed in step S5 (which will be explained hereinlater in FIG. 51). Then, step S6 follows. If the temperature is low, the $P'P^3MP'^3$ control is executed in step S4 (which will be explained hereinlater in FIG. 52). The processing routine ends in step S6.

(Flowchart for the $P'P^3MP'^3$ Control)

Figure 51:
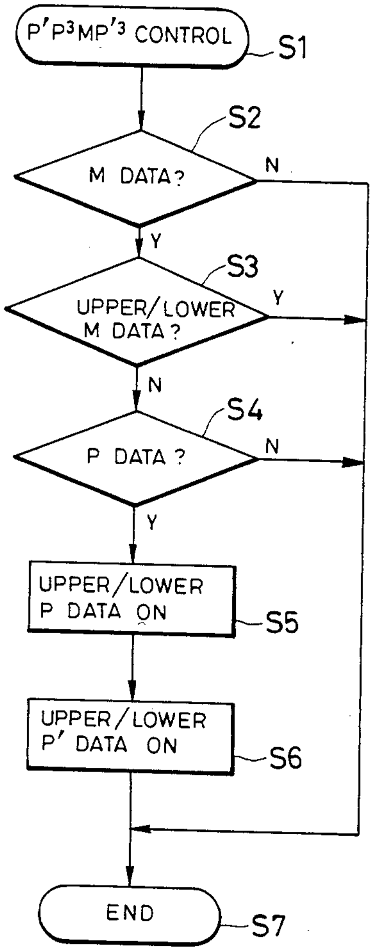
FIG. 51 is a flowchart for the $P'^3MP'^3$ control.

FIG. 51 is a flowchart for the $P'P^3MP'^3$ control shown in step S4 in FIG. 50.

In step S1, the control is started. In step S2, the presence or absence of the M data is checked. If the M data does not exist, step S7 follows. If the M data exists, the presence or absence of the upper and lower M data is checked in step S3. If either one of or both of the upper and lower M data exist, step S7 follows. If no M data exists, the presence or absence of the P data is checked in step S4. If the P data does not exist, step S7 follows. If the P data exists, the upper and lower P data are turned on in step S5. The upper and lower P' data are turned on in step S6. The control ends in step S7.

(Flowchart for the $P'P^3M$ Control)

Figure 52:
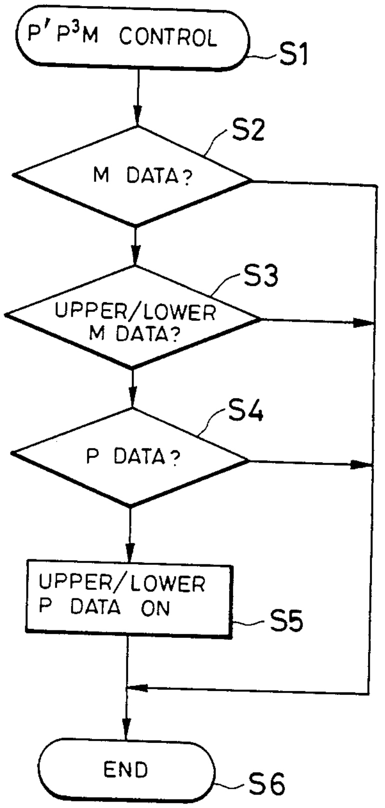
FIG. 52 is a flowchart for the $P'P^3M$ control.

FIG. 52 is a flowchart for the $P'P^3M$ control shown in step S5 in FIG. 50.

In step S1, the control is started. In step S2, the presence or absence of the M data is checked. If the M data does not exist, step S6 follows. If the M data exists, the presence or absence of the upper and lower M data is checked in step S3. If either one of or both of the upper and lower M data exist, step S6 follows. If no M data exists, the presence or absence of the P data is checked in step S4. If no P data exists, step S6 follows. If the P data exists, the upper and lower P data are turned on in step S5. The control ends in step S6.

(Flowchart for the One Serial/Parallel Dot Control in the P'PM Control)

Figure 53:
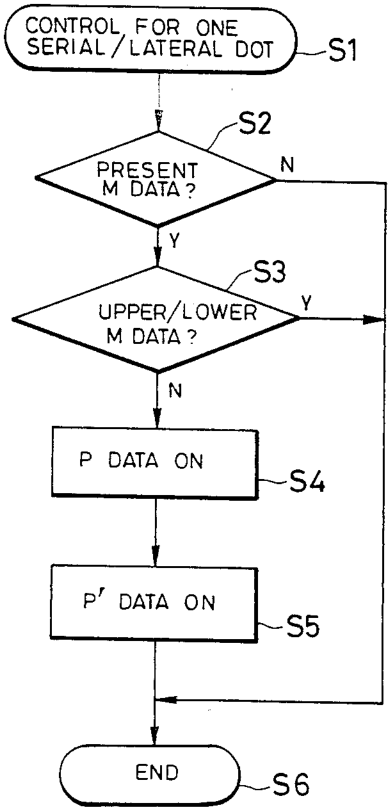
FIG. 53 is a flowchart for the one lateral dot control in the P'PM control.

FIG. 53 is a flowchart showing the one serial/lateral dot control in the P'PM control described in FIGS. 36 and 47.

In step S1, the control is started. In step S2, the presence or absence of the present M data is checked. If the present M data does not exist, step S6 follows. If it exists, the presence or absence of the upper and lower M data is checked in step S3. If either one of or both of the M data exist, step S6 follows. If no M data exists, the P data is turned on in step S4. The P' data is turned on in step S5. The control ends in step S6.

(System Flowchart)

The methods of controlling the heating of the thermal head have been described above together with the patterns. A whole system flowchart of the apparatus in the case of always performing the high quality printing by properly switching these control methods will now be described hereinbelow with reference to FIG. 54.

First, in step S1, the power source of the apparatus is turned on. In step S2, the whole apparatus such as various kinds of data in the RAM 11 and the like is initialized. This embodiment will be explained with respect to the thermal printed as an example. In this printer, for example, various kinds of ribbons such as ordinary ink ribbon IR, correctable ribbon CR in which the printing and erasure can be performed by the same ribbon, and dual color ribbon DR in which the ribbon is formed of a plurality of layers (the invention is not limited to this constitution) and the printing can be performed in two or more colors can be selectively mounted to the carriage 5.

In step S3, the input from the keyboard 1 or the input of data from the I/F connector 15 is detected If the data to be printed exists, step S4 follows and a check is made to see if the ribbon mounted to the carriage is the CR ribbon or not. This discrimination is made by the data from a ribbon sensor (not shown) or by the data such as kind, color, or the like of the ribbon which is indicated by a signal from the keyboard or the like, namely, from signal generating means for generating a signal representative of the ribbon. If NO in step S4, step S17 follows and a check is made to see if the ribbon is the DR ribbon or not. If the ribbon has been decided to be the CR ribbon in step S4, step S5 follows. In step S5, a check is made to see if the input key is the erasure key or not. If the erasure key has been input, step S29 follows and the erasing operation is executed. If NO in step S5, step S6 follows. In step S6, a check is made to see if the temperature is a high temperature of, e.g., 30° C. or higher or not on the basis of the data from the temperature measurement circuit 13 provided for the apparatus. If it is determined that the temperature is 30° C. or higher in step S6, the PPM control described in FIGS. 7 and 35 is selected in step S7. Then, the printing is performed in step S28.

If the temperature is not high in step S6, step S8 follows and the AMA control described in FIGS. 6 and 34 is selected. Further, a check is made in step S9 to see if the temperature is low (e.g., 14° C. or lower) or not. The process in step S9 is the same as step S3 in FIG. 39. If the temperature is not low, namely, if it is the ordinary temperature (e.g., 14° C. to 30° C.) in step S9, step S10 follows and the $AMA^3$ control described in FIGS. 11 and 40 is executed. Then, step S13 follows. If it is decided that the temperature is low in step S9, step S11 follows and the $A^3MA^3$ control described in FIGS. 14 and 41 is performed. Then, step S12 follows and the one serial/lateral dot control in the AMA control shown in FIGS. 18, 19-1 to 19-3, and 42 is executed. In steps S13 and S14, the AM and A'M underline controls shown in FIGS. 17 and 46 are executed. In the next steps S15 and S16, the "⊐"-, "⊓"-, and "□"-shape dot controls shown in FIGS. 20 to 22 and 43 to 45 are performed.

If the ribbon is not the CR ribbon in step S4, step S17 follows. If it is decided that the DR ribbon has been mounted in step S17, step S18 follows. In step S18, a check is made to see if a print color has been designated by the key input or color designation command data or the like or not. If a color (e.g., blue) has been designated, namely, if the ink on the recording paper side in the ink layer has been designated, step S25 follows. If no color is designated, namely, if the ink (black) on the thermal head side in the ink layer has been designated, step S19 follows. The process in step S19 is the same as step S3 in FIG. 50. In step S19, if the temperature is determined to be low on the basis of the data from the temperature measurement circuit 13 in FIG. 2, step S22 follows. If the temperature is not low, step S20 follows and the P'PM control described in FIGS. 8 and 36 is selected. In step S21, the $P'P^3M$ control described in FIGS. 23 and 52 is executed. The printing is performed in step S28.

If the temperature is decided to be low in step S19, step S22 follows and the P'PM (3, 2, 1) control described in FIGS. 9 and 37 is selected. In step S23, the $P'P^3MP'^3$ control shown in FIGS. 28 and 51 is executed. Further, in step S24, the one serial/lateral dot control in the P'PM control shown in FIGS. 32 and 53 is executed and the printing is performed in step S28.

If the DR ribbon has been mounted in step S17 and also if the print color of blue has been designated in step S18, step S25 follows. In step S25, a check is made to see if the temperature is high or not. If it is high, the PPM control described in FIGS. 7 and 35 is selected. If the temperature is not high, the AMA control described in FIGS. 6 and 34 in step S26 is selected and the printing is performed in step S28. After completion of the process in step S28, the processing routine is returned from step S31 to S3.

(Erasure Control)

The erasure in step S29 in FIG. 54 will now be explained. FIGS. 55A and 55B show examples of font patterns for erasure stored in the ROM 10. Practically speaking, each of these patterns consists of 24×8 dots and this pattern is repetitively used. For the pattern to be erased, if the ink which was all recorded by being heated by the M data is peeled off, there is a fear such that the heating energies are accumulated and the ribbon is sticked to the paper or a dirt occurs.

(MN Control)

Therefore, the N data obtained by reducing the heat pulse width of the M data to the interval of one dot in the lateral direction is heated. Further, since the erasing energy with respect to the first dot is low, by starting the heating from the timing which is preceding by two dots, the erasing energy of the first dot rises and this dot can be certainly erased. This erasure can be accomplished by use of the pattern shown in FIGS. 55A or 55B.

(Double Erasure by the Opposite Zig-Zag Patterns)

FIGS. 55A and 55B show the fonts of the zig-zag boxes which are used in the erasing mode. The dots are thinned out at intervals of one dot in each of the vertical and lateral directions. In this embodiment, the first erasing operation is executed in FIG. 55A. However, in order to certainly erase a character, it is necessary to erase again, i.e., twice. In the case of erasing at the second time, the font of FIG. 55B is used. The font of FIG. 55B is opposite to the font of FIG. 55A. The erasure is performed by shifting the M and N data positions by one dot at the second time as compared with the first erasing time. The using order of the fonts of FIGS. 55A and 55B may be reversed.

As explained above, the printed character can be certainly erased by executing the erasing process twice by use of the opposite fonts.

(Manual Erasure)

In the automatic erasing mode, the erasure span is determined by a width of character stored in the buffer. When the buffer is filled with characters, the characters are sequentially deleted from the buffer. When erasing the characters from the buffer, since the width data to be erased is not stored, the operating mode enters the manual erasinq mode. In the manual erasing mode, this mode needs to be informed to the operator and the width of the character to be erased needs to be input by the key.

The erasure span of the key-in character is obtained by the font and pitch (whole width and double width) which are being displayed at present. Thus, the character of only the erasure span obtained can be erased. Namely, the operator can freely select the erasure span and erase the character of the erasure span.

(Flowchart for Erasure (by the Zig-Zag Patterns))

Figure 54:
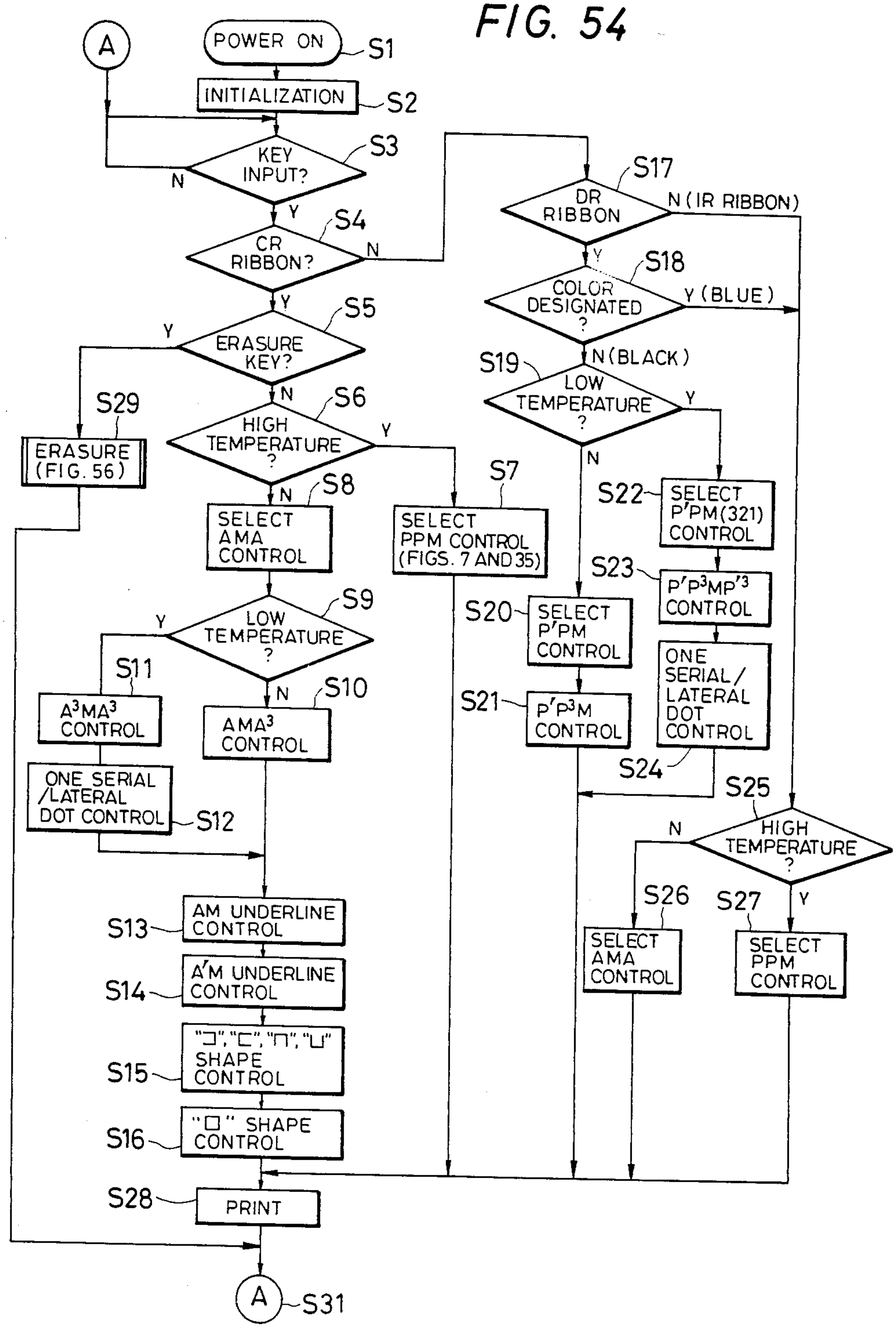
FIG. 54 is a system flowchart.
Figure 55A:
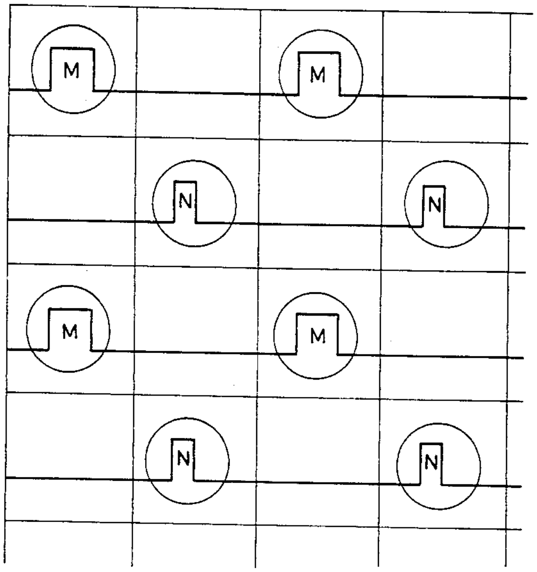
FIGS. 55A and 55B are explanatory diagrams of patterns for erasure.
Figure 55B:
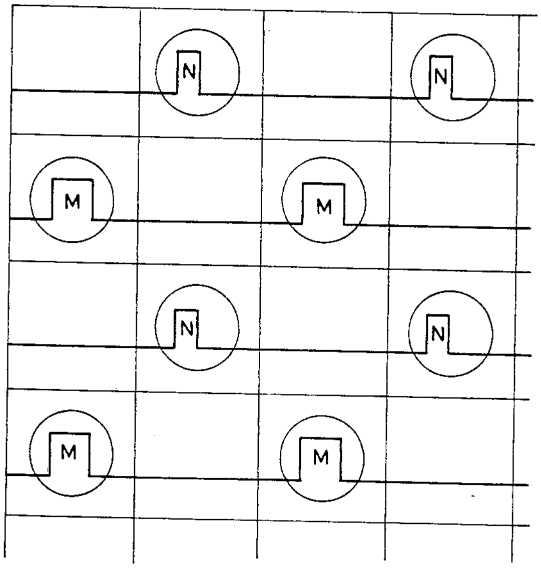
Figure 56:
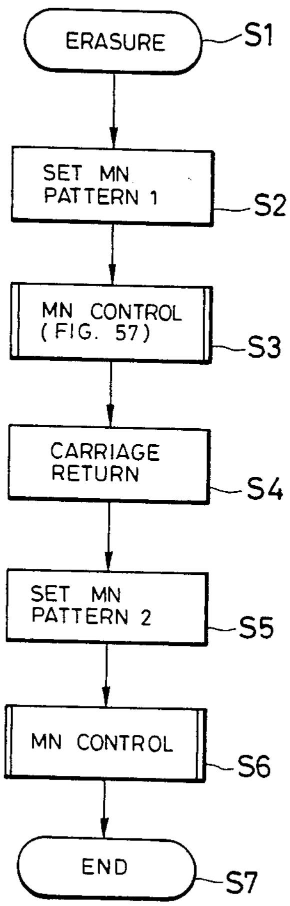
FIG. 56 is a flowchart for erasure (by a zigzag pattern)

FIG. 56 is a flowchart for erasure in step S29 in FIG. 54.

The processing routine is started in step S1. In step S2, the MN dot pattern 1 is set. In this case, the dots and heat pattern in FIG. 55A are used. In step S3, the MN control (FIG. 57) is executed and the first erasure is performed. In step S4, the thermal head (carriage) 6 which moved in association with the erasing operation is returned to the first erasure starting position. In step S5, the MN dot pattern 2 is set. In this case, the dots and heat pattern in FIG. 55B are used. In step S6 the MN control (FIG. 57) is executed and the second erasure is performed. The processing routine ends in step S7.

In this embodiment, the heating energies can be also further changed in a plurality of erasing operations as mentioned above in the erasure. By sequentially reducing the heat pulse widths in accordance with the number of erasing operation times in consideration of the heat accumulation of the head, the heating energies can be held to a constant proper value every time. This method is particularly useful in the case of using the foregoing CR ribbon.

(Flowchart for the MN Control)

Figure 57:
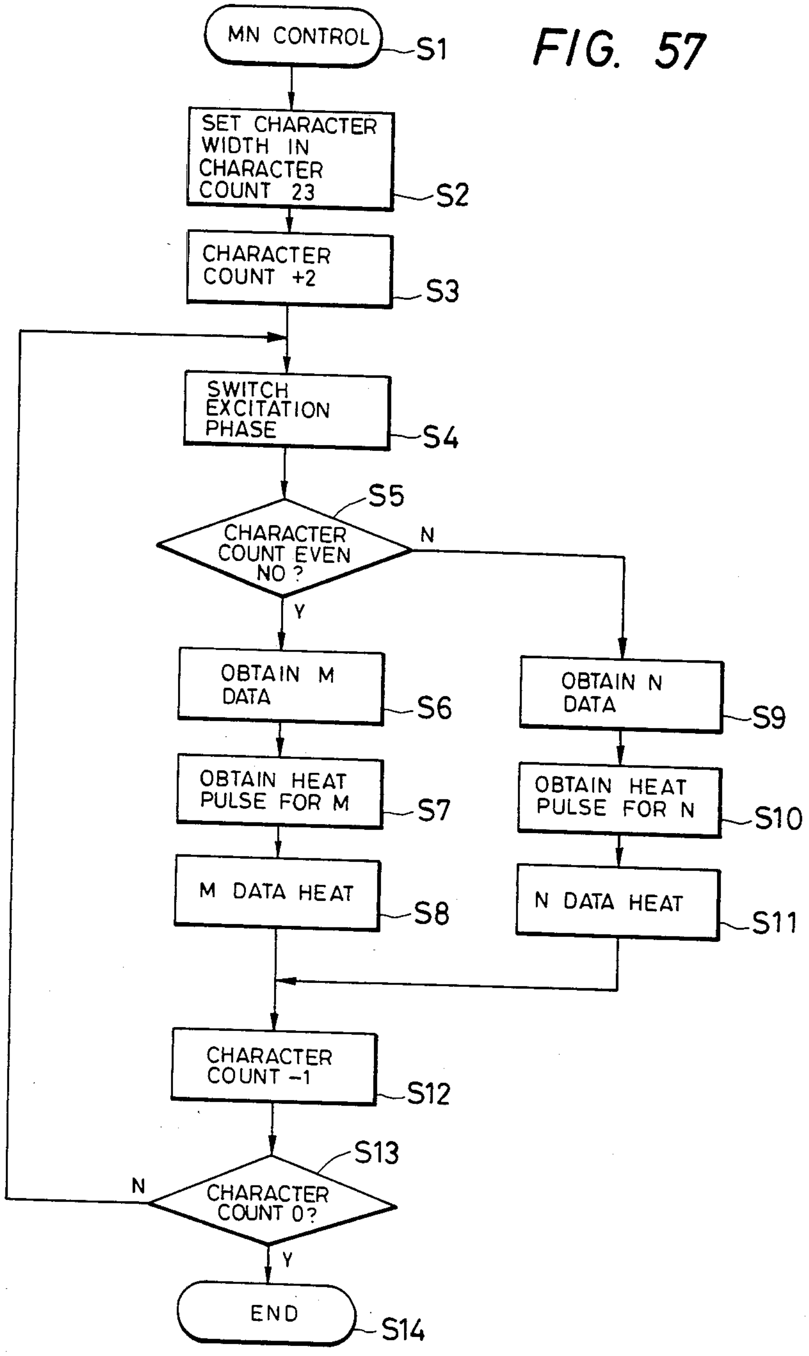
FIG. 57 is a flowchart for the MN control.

FIG. 57 is a flowchart for the MN control.

In step S1, the control is started. In step S2, a width of character to be erased is obtained from the CG and set into the character count unit 23 in the RAM 11. In step S3, the character count value obtained in step S2 is increased by "2". Thus the erasure can be performed from the timing which is preceding to the character by two dots. In step S4, the excitation phase of the stepping motor is switched. In step S5, a check is made to see if the character count value obtained in steps S2 and S3 is the even number or the odd number. If it is the odd number, step S9 follows. If it is the even number, the M data is obtained in step S6. In step S7, the heat pulse width of the M data is derived. In step S8, the M data obtained in steps S6 and S7 is heated. Then, step S12 follows.

In step S9, the N data is obtained. In step S10, the heat pulse width of the N data is obtained. In step S11, the N data obtained in steps S9 and S10 is heated. Then, step S12 follows.

In step S12, the character count value is decreased by "1". In step S13, a check is made to see if the character count value is "0" or not. If it is not "0", the processing routine is returned to step S4. If it is "0", the control ends in step S14.

(Flowchart for Manual Erasure)

Figure 58:
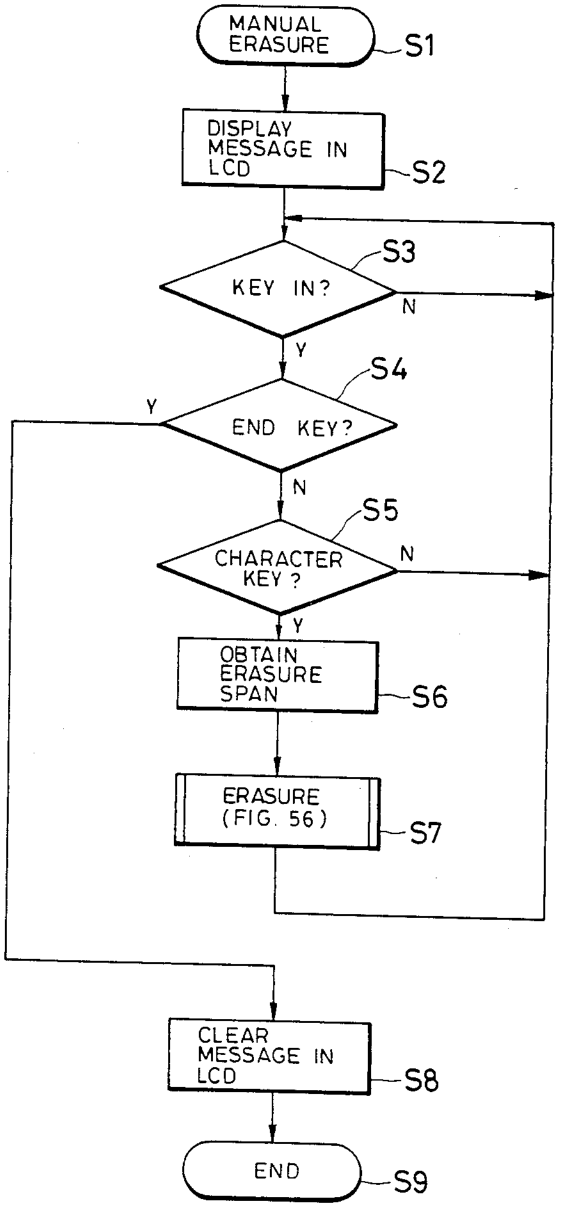
FIG. 58 is a flowchart for manual erasure.

FIG. 58 is a flowchart for manual erasure.

In step S1, the processing routine is started. In step S2, a message is displayed by the LCD to inform the operator of the fact that the manual erasing mode has been set. In step S3, a check is made to see if the key input has been made or not. If NO, step S3 is repeated. If the key input has been made, a check is made in step S4 to see if it indicates the END key or not. If it is the END key, step S8 follows. If NO, a check is made in step S5 to see if the input key is the character key or not. If NO, the processing routine is returned to step S3. If it is the character key, a width of character corresponding to the input key is obtained from the CG to thereby obtain the erasure span in step S6. In step S7, the erasing operation is performed by only the amount of the erasure span obtained in step S6. Then, step S3 follows.

In step S8, the message displayed on the LCD is cleared and the end of manual erasing mode is informed to the operator. The processing routine ends in step S9.

As explained in detail above, according to the invention, even if the ribbon was variably changed, the proper heat control can be always performed. Therefore, the printer which can perform the very high quality recording can be provided.

As described in detail above, according to the invention, even in the heat cycles other than the heat cycle (recording timing) of the dot as the data to be recorded, by performing the preheat to record this dot, the very high quality recording can be performed.

As described in detail above, according to the invention, it is possible to provide a thermal transfer printer comprising: heating energy generating means for generating heating energies; means for transferring dot information to be recorded; and control means for controlling the heating energy generating means in a manner such that when recording the dot information transferred by the transferring means, after the first preheating energies were generated in the first recording cycle prior to the dot information to be recorded in the second recording cycle, the second preheating energies different from the first preheating energies are further generated before the heating energies corresponding to the dot information are generated in the second recording cycle. On the other hand, by uniforming the heating energies, the high quality recording can be performed.

Even in the case of recording at a low speed, the very high quality recording can be executed.

As explained in detail above, according to the invention, one dot in the left edge portion of a recording pattern, particularly, one independent dot in each of the upper and lower directions can be certainly recorded.

As described in detail above, according to the invention, even in the heat cycles other than one heat cycle of the dot information to be recorded, the preheat is given, and in a predetermined heat cycle, the heating energies corresponding to the dot information to be recorded are not generated, so that a very high quality underline can be recorded.

Since the preheat is increased for the first dot of the underline, the underline can be recorded from the beginning at a high quality.

By eliminating the heat pulses corresponding to the dot information to be recorded in predetermined cycles and by reducing the number of pulses within one heat cycle, the concentration of the heating energies can be prevented, so that the underline of a very quality can be recorded.

Not only by reducing the heat pulse width but also by deleting the heat pulses within one heat cycle, the concentration of the heating energies can be prevented. Therefore, the heating energies can be independently applied to the characters and underline. Both of the characters and underline can be printed at a high quality.

As described in detail above, according to the invention, even in the cycles other than one heat cycle of the dot information to be recorded, by applying the preheat and by eliminating the preheat in predetermined cycles, the underline of a very high quality can be recorded.

Since the amount of preheat is increased for only the first dot of the underline, the underline can be recorded at a high quality from the beginning.

By reducing the number of preheat pulses at intervals of one dot, the concentration of the heating energies can be prevented, so that the underline of a very high quality can be recorded. Due to this, not only by reducing the heat pulse width but also by eliminating the heat pulses within one heat cycle, the concentration of the heating energies can be prevented. Therefore, the heating energies can be independently applied to the characters and underline, so that both of the characters and underline can be printed at a high quality.

As described in detail above, according to the invention, in the case of recording the "コ"-, "⊓"-, "⊔"-, and "□"-shape dot patterns consisting of at least the dots of the directions including the dots in the right direction, the preheat to record the dots in the right direction is not performed, so that the high quality recording without deformation can be executed.

As described in detail above, according to the invention, in an apparatus for recording dot information by use of the heating energies, it is possible to provide a printer comprising: heating energy generating means for generating heating energies; reading means for reading out dot information indicative of a pattern to be recorded; and control means for controlling the heating energy generating means in a manner such that in the case where the pattern which was read out by the reading means is pattern in which the dot information exists at least three peripheral directions including the dot information in the recording direction, the preheating energies to record the dot information in the recording direction are not generated.

As described in detail above, according to the invention, in the case of recording dot information surrounded by the dot information to be together recorded in four peripheral directions, the heating energies are reduced to a degree so as not to form a blank the center with respect to that dot information, so that even in the case of a "□"-shape dot pattern, the high quality recording can be performed.

As described in detail above, according to the invention, in an apparatus for recording dot information by use of heating energies, it is possible to provide a printer comprising: heating energy generating means for generating heating energies; reading means for reading out dot information indicative of a pattern to be recorded; and control means for controlling the heating energy generating means in a manner such that in the pattern which was read out by the reading means, in the case of recording the dot information in which the dot information exists in four peripheral directions, only the preheating energies to record the dot information in the recording direction are generated within the cycle to record the relevant dot information, or to provide a control method for such a printer.

As described in detail above, according to the invention, by correcting the heating energies for not only the first dot but also a few dots, it is possible to provide a thermal transfer printer which can perform the very high quality recording. By continuously correcting the heating energies, the recording can be certainly executed even at the start of the recording at low temperatures or the like.

As described in detail above, according to the invention, in the recording cycle before the recording cycle of the dot information to be recorded, by applying additional preheating energies in the further upper or lower direction of the preheating energies to be applied, in particular, the independent dot information can be certainly recorded.

We claim:

1. A printer in an apparatus for recording dot information by use of heating energies, comprising:

memory means in which dot information indicative of a pattern to be recorded is stored;

heating energy generating means for generating heating energies; and control means for controlling the generation of the heating energies from said heating energy generating means, wherein in the case where the ON-state dot information to be recorded which has been stored in said memory means in a first recording cycle does not exist and the ON-state dot information to be recorded in a next second recording cycle exists, said control means controls a generation timing of said heating energy generating means in a manner such that heating energies are auxiliarily generated in the first recording cycle prior to said dot information to be recorded.

2. A printer according to claim 1, wherein said control means controls the generation timing of said heating energy generating means in a manner such that the additional heating energies are auxiliarily generated after the heating energies corresponding to the dot information to be recorded were generated in said second recording cycle.

3. A printer according to claim 1, wherein said auxiliary heating energies in said first recording cycle are generated at a timing near the start of said first recording cycle.

4. A printer according to claim 1, wherein said recording cycle is determined on the basis of a switching of an excitation phase of a motor to control the movement of a carriage on which said heating energy generating means is mounted.

5. A printer in an apparatus for recording dot information by use of heating energies, comprising:

heating energy generating means for generating heating energies;

means for transferring dot information to be recorded; and control means for controlling said heating energy generating means in a manner such that first preheating energies are generated in a first recording cycle prior to the dot information to be recorded in a second recording cycle when the dot information transferred by said transfer means is recorded in the second recording cycle, and further, second preheating energies different from said first preheating energies are generated before the heating energies corresponding to said dot information are generated within the second recording cycle.

6. A printer according to claim 5, wherein the generating positions or generating periods of time at which said first and second preheating energies are generated within one recording cycle are different.

7. A printer according to claim 5, wherein said recording cycle is determined on the basis of a switching of an excitation phase of a motor to control the movement of a carriage on which said heating energy generating means is mounted.

8. A printer in an apparatus for recording dot information by use of heating energies, comprising:

heating energy generating means for generating heating energies;

memory means in which dot information indicative of a pattern to be recorded is stored;

deciding means for taking out the pattern stored in said memory means and for discriminating said dot information in the case where the dot information to be recorded in at least the upper or lower direction does not exist; and control means for controlling said heating energy generating means in a manner such that in a heat cycle to record said dot information to be recorded which was discriminated by said deciding means, auxiliary heating energies to record said dot information are generated in said upper or lower direction.

9. A printer according to claim 8, wherein said recording cycle is determined on the basis of a switching of an excitation phase of a motor to control the movement of a carriage on which said heating energy generating means is mounted.

10. A printer in an apparatus for recording dot information by use of heating energies, comprising:

heating energy generating means for generating heating energies;

instructing means for instructing the recording of dot information train which continue in a recording direction; and control means for controlling said heating energy generating means in a manner such that after the heating energies corresponding to the dot information to be recorded in a first recording cycle were generated, the recording is performed by generating preheating energies prior to the dot information to be recorded in a second recording cycle on the basis of the instruction by said instructing means, and in predetermined recording cycles, the heating energies corresponding to the dot information to be recorded in said predetermined recording cycles are not generated.

11. A printer according to claim 10, wherein said preheating energies prior to the dot information to be recorded first are different from the preheating energies which are generated during the recording of said continuous dot information.

12. A printer according to claim 10, wherein said recording direction is a moving direction of said heating energy generating means.

13. A printer according to claim 10, wherein said recording cycle is determined on the basis of a switching of an excitation phase of a motor to control the movement of a carriage on which said heating energy generating means is mounted.

14. A printer in an apparatus for recording dot information by use of heating energies, comprising:

heating energy generating means for generating heating energies;

instructing means for instructing the recording of dot information train which continue in a recording direction; and control means for controlling said heating energy generating means in a manner such that after the heating energies corresponding to the dot information to be recorded in a first recording cycle were generated, the recording is performed by generating preheating energies prior to the dot information to be recorded in a second recording cycle on the basis of the instruction by said instructing means, and in predetermined recording cycles, said preheating energies to be generated after the dot information to be recorded in said predetermined recording cycles are not generated.

15. A printer according to claim 13, wherein said preheating energies prior to the dot information to be recorded first are different from preheating energies which are generated during the recording of said continuous dot information.

16. A printer according to claim 13, wherein said recording cycle is determined on the basis of a switching of an excitation phase of a motor to control the movement of a carriage on which said heating energy generating means is mounted.

17. A printer in an apparatus for recording dot information by use of heating energies, comprising:

heating energy generating means for generating heating energies;

reading means for reading out dot information indicative of a pattern to be recorded; and control means for controlling said heating energy generating means in a manner such that in the case where the pattern which was read out by said reading means is a pattern in which the dot information exists in at least three peripheral directions including the dot information in a recording direction, preheating energies to record the dot information in said recording direction are not generated.

18. A printer according to claim 17, wherein said recording cycle is determined on the basis of a switching of an excitation phase of a motor to control the movement of a carriage on which said heating energy generating means is mounted.

* * * * *

UNITED STATES PATENT AND TRADEMARK OFFICE
CERTIFICATE OF CORRECTION

PATENT NO. : 4,827,286

DATED : May 2, 1989

INVENTOR(S) : Sukigara, et al.

It is certified that error appears in the above-identified patent and that said Letters Patent is hereby corrected as shown below: Title page:

FOREIGN APPLICATION PRIORITY DATA

After "Dec. 27, 1986 [JP] Japan ...... 61-312641", insert
--Dec. 27, 1986 [JP] Japan ...... 61-312642
Dec. 27, 1986 [JP] Japan ...... 61-312643
Dec. 27, 1986 [JP] Japan ...... 61-312644
Dec. 27, 1986 [JP] Japan ...... 61-312645
Dec. 27, 1986 [JP] Japan ...... 61-312646
Dec. 27, 1986 [JP] Japan ...... 61-312647
Dec. 27, 1986 [JP] Japan ...... 61-312648
Dec. 27, 1986 [JP] Japan ...... 61-312649
Dec. 27, 1986 [JP] Japan ...... 61-312650
Dec. 27, 1986 [JP] Japan ...... 61-312651--.

COLUMN 1

Line 7, change "at a" to --with--.

COLUMN 2

Line 6, delete "such"; and
Line 50, change "comprising" to --comprising:--.

COLUMN 4

Line 18, change "for "z"-shape" to --for "]"-shape--.

COLUMN 5

Line 46, change "key" to --key:--.

COLUMN 9

Line 12, change "P'BM control" to --P'PM control--; and
Line 46, change "lack." to --are insufficient.--

COLUMN 10

Line 39, change "control" to --control.--

COLUMN 11

Line 4, change "dots" to --dots.--

UNITED STATES PATENT AND TRADEMARK OFFICE

CERTIFICATE OF CORRECTION

PATENT NO. : 4,827,286 Page 2 of 3

DATED : May 2, 1989

INVENTOR(S) : Sukigara, et al.

It is certified that error appears in the above-identified patent and that said Letters Patent is hereby corrected as shown below:

COLUMN 12

Line 1, change "(" "-shape dot control)" to --("⌐"-shaped dot control)--.

COLUMN 14

Line 9, change "three dots" to --three dots.--.

COLUMN 15

Line 16, change "FIGS. 34 to 36," to --FIGS. 34 to 35,--.

COLUMN 16

Line 23, change "the "↰"-shape" to --the "┌┐"-shape--.

COLUMN 18

Line 61, change "FIG. 51)." to --FIG. 53).--.

COLUMN 19

Line 37, change "FIG. 51)." to --FIG. 52).--; and
Line 40, change "FIG. 52)." to --FIG. 51).--.

COLUMN 20

Line 39, change "detected" to --detected.--; and

UNITED STATES PATENT AND TRADEMARK OFFICE

CERTIFICATE OF CORRECTION

PATENT NO. : 4,827,286 Page 3 of 3

DATED : May 2, 1989

INVENTOR(S) : Sukigara, et al.

It is certified that error appears in the above-identified patent and that said Letters Patent is hereby corrected as shown below:

COLUMN 22

Line 45, change "in.FIG. 55A" to --in FIG. 55A--.

Signed and Sealed this

Twenty-first Day of August, 1990

*Attest:*

HARRY F. MANBECK, JR.

*Attesting Officer* *Commissioner of Patents and Trademarks*